United States Patent
Matsuoka et al.

(10) Patent No.: US 7,318,044 B2
(45) Date of Patent: Jan. 8, 2008

(54) INFORMATION PROVIDING SYSTEM, INFORMATION PROVIDING DEVICE, AND SYSTEM FOR CONTROLLING ROBOT DEVICE

(75) Inventors: Tsunetaro Matsuoka, Tokyo (JP); Hideki Noma, Kanagawa (JP); Tetsuya Konishi, Tokyo (JP); Makoto Inoue, Kanagawa (JP); Masahiro Fujita, Saitama (JP); Katsuya Muramatsu, Kanagawa (JP); Noritoshi Inoue, Tokyo (JP); Masashi Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 833 days.

(21) Appl. No.: 09/958,408

(22) PCT Filed: Feb. 9, 2001

(86) PCT No.: PCT/JP01/00952

§ 371 (c)(1), (2), (4) Date: Feb. 19, 2002

(87) PCT Pub. No.: WO01/59642

PCT Pub. Date: Aug. 16, 2001

(65) Prior Publication Data

US 2003/0158629 A1    Aug. 21, 2003

(30) Foreign Application Priority Data

Feb. 10, 2000   (JP) ............................. 2000-038249

(51) Int. Cl.
G06Q 30/00    (2006.01)
(52) U.S. Cl. ..................................................... 705/27
(58) Field of Classification Search ................ 700/245, 700/218; 434/169; 705/26, 27, 37

See application file for complete search history.

(56) References Cited

U.S. PATENT DOCUMENTS

| 5,845,077 A | 12/1998 | Fawcett |
| 5,940,807 A | 8/1999 | Purcell |
| 6,115,648 A * | 9/2000 | Gallo ........................ 700/218 |
| 6,319,010 B1 * | 11/2001 | Kikinis ...................... 434/169 |
| 6,577,923 B1 * | 6/2003 | White et al. ................ 700/245 |
| 2001/0034559 A1 * | 10/2001 | Brown et al. ................. 700/17 |
| 2002/0177383 A1 * | 11/2002 | Hornsby et al. ............ 446/175 |

FOREIGN PATENT DOCUMENTS

EP    0 811 942    12/1997

(Continued)

Primary Examiner—Gerald J. O'Connor
(74) Attorney, Agent, or Firm—Frommer Lawrence & Haug LLP; William S. Frommer; Paul A. Levy

(57) ABSTRACT

The present invention makes it possible and easier to serve optimum robot components/devices/accessories by means of an information service system including personal terminal devices (31A to 31C) connected to an information communication network via a telecommunication line, and a server (38) connected to the information communication network via the telecommunication line to cumulatively store information on components/devices/accessories available from a plurality of manufacturers (37a, 37c and 37c) (third party) of components/devices/accessories of a robot 1, as classified according to the attributes of the components/devices/accessories and send, to the personal terminal devices (31A to 31C) connected thereto, options information prepared based on the attribute of the cumulatively stored components/devices/accessories information and including a plurality of items for selection of a robot component.

3 Claims, 18 Drawing Sheets

FOREIGN PATENT DOCUMENTS

| | | |
|---|---|---|
| EP | 0 898 237 A2 * | 2/1999 |
| EP | 0 924 034 A2 | 6/1999 |
| JP | 1-103740 | 4/1989 |
| JP | 6-68063 | 3/1994 |
| JP | 6-214996 | 8/1994 |
| JP | 10 49221 | 2/1998 |
| JP | 10-235019 | 9/1998 |
| JP | 10-320454 | 12/1998 |
| JP | 11-91189 | 4/1999 |
| JP | 11-126017 | 5/1999 |
| JP | 11-188678 | 7/1999 |

* cited by examiner

NODE₁₀₀ NODE₁₂₀

| NODE 100 | | | | PROBABILITY OF TRANSITION TO OTHER NODE (Di) | | | | NODE 600 |
|---|---|---|---|---|---|---|---|---|
| TRANSITION DESTINATION NODE | | | | NODE 120 | NODE 120 | NODE 120 | NODE 1000 | |
| OUTPUT ACTION | | | | ACTION 1 | ACTION 2 | MOVE BACK | | ACTION 4 |
| | INPUT EVENT NAME | DATA NAME | DATA RANGE | | | | | |
| 1 | BALL | SIZE | 0, 1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0, 100 | | | | 50% | |
| 6 | | JOY | 50, 100 | | | | 100% | |
| 7 | | SURPRISE | 50, 100 | | | | | |
| 8 | | SADNESS | 50, 100 | | | | | |

INFORMATION PROVIDING SYSTEM, INFORMATION PROVIDING DEVICE, AND SYSTEM FOR CONTROLLING ROBOT DEVICE

TECHNICAL FIELD

The present invention relates to an information service system and method for serving information to personal terminal devices via a data communication network, an information server for serving information on components/devices/accessories of a robotic device, and a robotic device management system and method.

BACKGROUND ART

Recently, there have been proposed robotic devices each capable of autonomously deciding its own behavior correspondingly to its surrounding environment and internal state. Such robots include for example ones of a type which can have a pseudo-emotion and -instinct (will be referred to as "emotion" and "instinct" hereunder) which are changed according to its environment and internal state, and behave correspondingly to such changes in emotion and instinct, that is, can reflect changes of its emotion and instinct in its action, and also ones of a type which can behave in a manner corresponding to each of its growing steps.

Of these types of recent robots, the motion, instinct and growth vary adaptively to their environment and internal state. For example, different manners of handling will result in different internal states such as emotion, respectively, in the robot. Namely, the same robot showing a behavior when handled by a user will behave in a different manner when handled by another user.

Many robotic devices are commercially available. Usually, robotic devices on the market are designed under their respective predetermined specifications and cannot be of any other than the predetermined specification. Some robots have recently become available which are designed according to customer-selected specifications, respectively; practically, however, not many kinds of specifications are prepared for a single model. The user will lose interest in playing with the robot which cannot be of another specification.

Thus, if the specification of a robotic device can be changed to a desired one after the purchase of the device, the user can enjoy playing with his or her robotic device as if it were of another version. Such a change in specification of a robotic device after purchased, that is possible for the user, can be implemented through replacement of an existing component/device/accessory of the robot with a user-defined one for example.

Thus, in case an existing component/device/accessory of the robotic device can be replaced with any desired adaptive component, if the user can easily search for an adaptive component/device/accessory from many components/devices/accessories of the robot, he will be able to simply change the specification of his robot. This will also lead to the advantage or profit of the manufacturer or distributor of the robot. In such a case, adding a user's demand, quality and information on robotic devices the user has so far used to information used to search for the component/device/accessory will make it possible to accurately search for the component/device/accessory in consideration.

If such components/devices/accessories can be supplied from the manufacturer or distributor of the robotic device as well as from a third party (for example, a third party which is accessible on the information communication network), a wider variety of robotic device components/devices/accessories will be available from them, and thus the user can have a wider choice of components/devices/accessories for his robotic device.

Further, by collecting information such as demand from a user of a robotic device and information about components/devices/accessories available from a third party and analyzing the correlation between the information, it is possible to smoothly supply robotic device components/devices/accessories from the manufacturer or distributor to the user.

DISCLOSURE OF THE INVENTION

Accordingly, the present invention has an object to overcome the above-mentioned drawbacks of the prior art by providing an information service system and method, information server, and a robotic device management system and method, adapted to allow and facilitate supply of optimum robotic device components/devices/accessories to a user of a robotic device.

The above object can be attained by providing an information service system including: communication terminal devices connected to an information communication network via a telecommunication line; and an information management unit connected to the information communication network via the telecommunication line to cumulatively store information about components/devices/accessories of a robotic device composed of a plurality of components/devices/accessories, available from a plurality of component/device/accessory manufacturers or distributors, as classified according to the attributes of the components/devices/accessories, and send, to the communication terminal devices when connected thereto, options information including a plurality of options for selection of components/devices/accessories, the options information having been prepared on the basis of attributes of the cumulatively stored components/devices/accessories information; the communication terminal devices selecting a component/device/accessory based on the options information.

Since the information service system constructed as in the above according to the present invention is connected to the information communication network via the telecommunication line to cumulatively store information about components/devices/accessories of a robotic device composed of a plurality of components/devices/accessories, available from a plurality of component/device/accessory manufacturers or distributors, as classified according to the attributes of the components/devices/accessories, and sends, to the communication terminal devices when connected thereto, options information including a plurality of options for selection of components/devices/accessories, the options information having been prepared on the basis of attributes of the cumulatively stored components/devices/accessories information, the user can easily select an optimum one from the components/devices/accessories available from the plurality of manufacturers or distributors on the basis of the options information by operating the communication terminal device.

Also the above object can be attained by providing an information service method to be effected in an information service system including communication terminal devices connected to an information communication network via a telecommunication line and an information management unit connected to the information communication network via the telecommunication line to cumulatively store information about components/devices/accessories of a robotic device composed of a plurality of components/devices/accessories, available from a plurality of component/device/accessory manufacturers or distributors, as classified according to the attributes of the components/devices/accessories, the method including steps of: sending, to the communication terminal devices when connected to the information management unit, options information including a plurality of options for selection of components/devices/accessories, the options information having been prepared on the basis of attributes of the cumulatively stored components/devices/accessories information; and selecting a component/device/accessory based on the options information sent in the sending step.

The above information service method allows the user to easily select an optimum one from the components/devices/accessories available from the plurality of manufacturers or distributors based on the options information by operating the communication terminal device.

Also, the above object can be attained by providing an information server including: means for storage of robot-related information on a robotic device composed of a plurality of components/devices/accessories; means for storage of information about the components/devices/accessories of the robotic device; and means for reading the robot-related information from the robot-related information storage means and selecting a predetermined piece of components/devices/accessories information from the components/devices/accessories information storage means based on the robot-related information.

The information server constructed as in the above reads the robot-related information from the robot-related information storage means by the components/devices/accessories information selecting means, and selects the predetermined piece of components/devices/accessories information stored in the components/devices/accessories information storage means, thereby serving an optimum piece of components/devices/accessories information for the robotic device.

Also, the above object can be attained by providing an information serving method including steps of: storing, into storage means, robot-related information on a robotic device composed of a plurality of components/devices/accessories and components/devices/accessories information on the robotic device; and reading the robot-related information stored in the storage means in the storing step and selecting a predetermined piece of components/devices/accessories information from the storage means based on the robot-related information, thereby serving an optimum piece of components/devices/accessories information for the robotic device.

Also, the above object can be attained by providing a robotic device management system includes: a manufacturer or distributor of an autonomous type robotic device which can be constructed of components/devices/accessories and autonomously behave based on an external factor and/or an internal factor; a plurality of manufacturers or distributors of components/devices/accessories for the robotic device; and a robotic device manager that manages, as information, components/devices/accessories available from the component/device/accessory manufacturers or distributors, selects one of the component/device/accessory manufacturers or distributors by referring to the information on the available components/devices/accessories upon reception of an order from a demander for a component/device/accessory of the robotic device and then issues an order for the component/device/accessory ordered by the demander to the selected one of the component/device/accessory manufacturers or distributors.

In the robotic device management system constructed as in the above, an autonomous type robotic device which can be constructed of components/devices/accessories and autonomously behave based on an external factor and/or an internal factor are produced or distributed by the robotic device manufacturer or distributor, the components/devices/accessories available from the plurality of component/device/accessory manufacturers or distributors of the components/devices/accessories for the robotic device is managed as information, and upon reception of an order from a demander for a robotic device component, one of the component/device/accessory manufacturers or distributors is selected by referring to the information on the available components/devices/accessories and then an order for the component/device/accessory ordered by the demander is issued to the selected one of the component/device/accessory manufacturers or distributors.

In the above robotic device management system, the robotic device is produced or distributed by the robotic device manufacturer or distributor while upon reception of an order for a component/device/accessory from a demander having purchased the robotic device, the robotic device manager selects an optimum one of the component/device/accessory manufacturers or distributors and then issues an order for the component/device/accessory ordered by the demander to the selected component/device/accessory manufacturer or distributor.

Also, the above object can be attained by providing a robotic device management method in which: there is produced or distributed an autonomous type robotic device which can be constructed of components/devices/accessories and autonomously behave based on an external factor and/or an internal factor; a demander having purchased the robotic device issues an order for a component/device/accessory to a robotic device manager that manages, as information, components/devices/accessories available from a plurality of component/device/accessory manufacturers or distributors of the components/devices/accessories for the robotic device; and upon reception of an order from a demander for a component/device/accessory of the robotic device and then issues an order for the component/device/accessory having been ordered from the demander, the robotic device manager selects one of the component/device/accessory manufacturers or distributors by referring to the information on the available components/devices/accessories and then issues an order for the component/device/accessory ordered from the demander to the selected one of the component/device/accessory manufacturers or distributors.

In the above robotic device management method, the robotic device is produced or distributed by the robotic device manufacturer or distributor while upon reception of an order for a component/device/accessory from a demander having purchased the robotic device, the robotic device manager selects an optimum one of the component/device/accessory manufacturers or distributors and then issues an order for the component/device/accessory ordered by the demander to the selected component/device/accessory manufacturer or distributor.

BRIEF DESCRIPTION OF THE DRAWINGS

FIG. 5 shows a state transition table.

BEST MODE FOR CARRYING OUT THE INVENTION

The present invention will be further discussed below concerning an embodiment thereof with reference to the accompanying drawings. The embodiment of the present invention is an information service system which serves a variety of information to a user of a robotic device according to the present invention via an information communication network such as Internet. The robotic device according to the present invention will first be described below.

Figure 1:
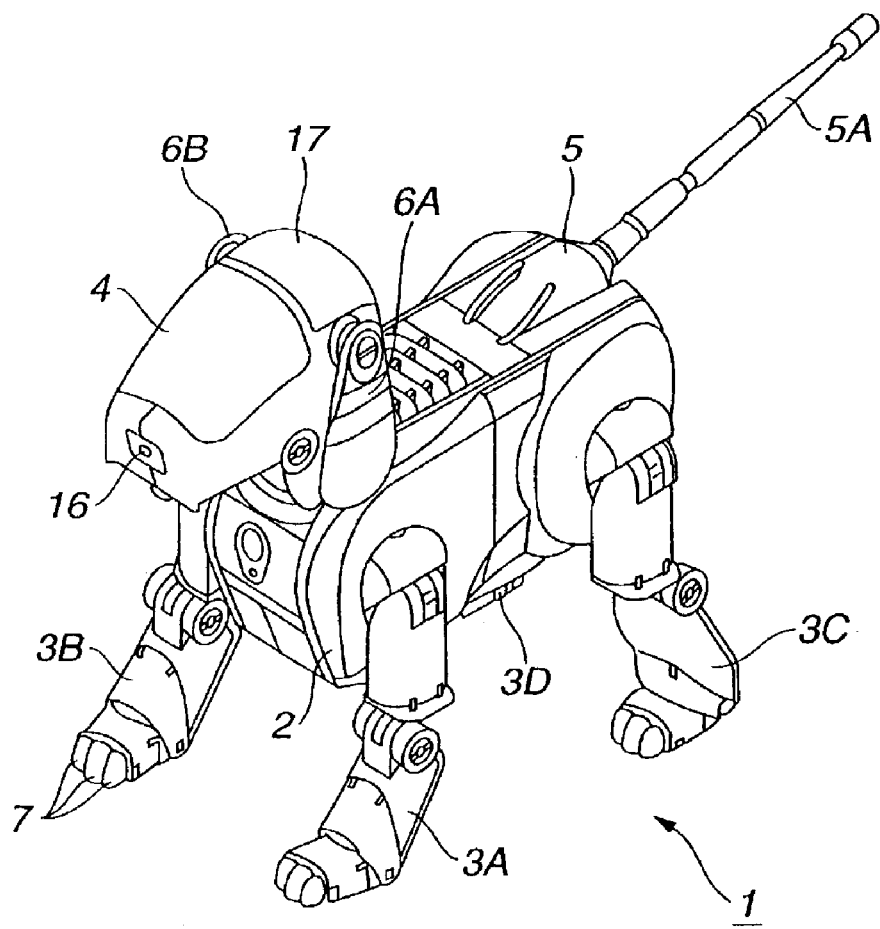
FIG. 1 is a perspective view of a robotic device composed of components/devices/accessories on which the information service system according to the present invention serves information.

(1) Construction of the Robotic Device (1-1) Construction of the Robotic Device According to the Present Invention As shown in FIG. 1, the robotic device (will be referred to simply as "robot" hereunder) is generally indicated with a reference 1. The robot 1 includes a body unit 2 having leg units 3A to 3D joined at the front right and left and rear right and left thereof, and a head unit 4 and tail unit 5 joined at the front and rear ends thereof.

Figure 2:
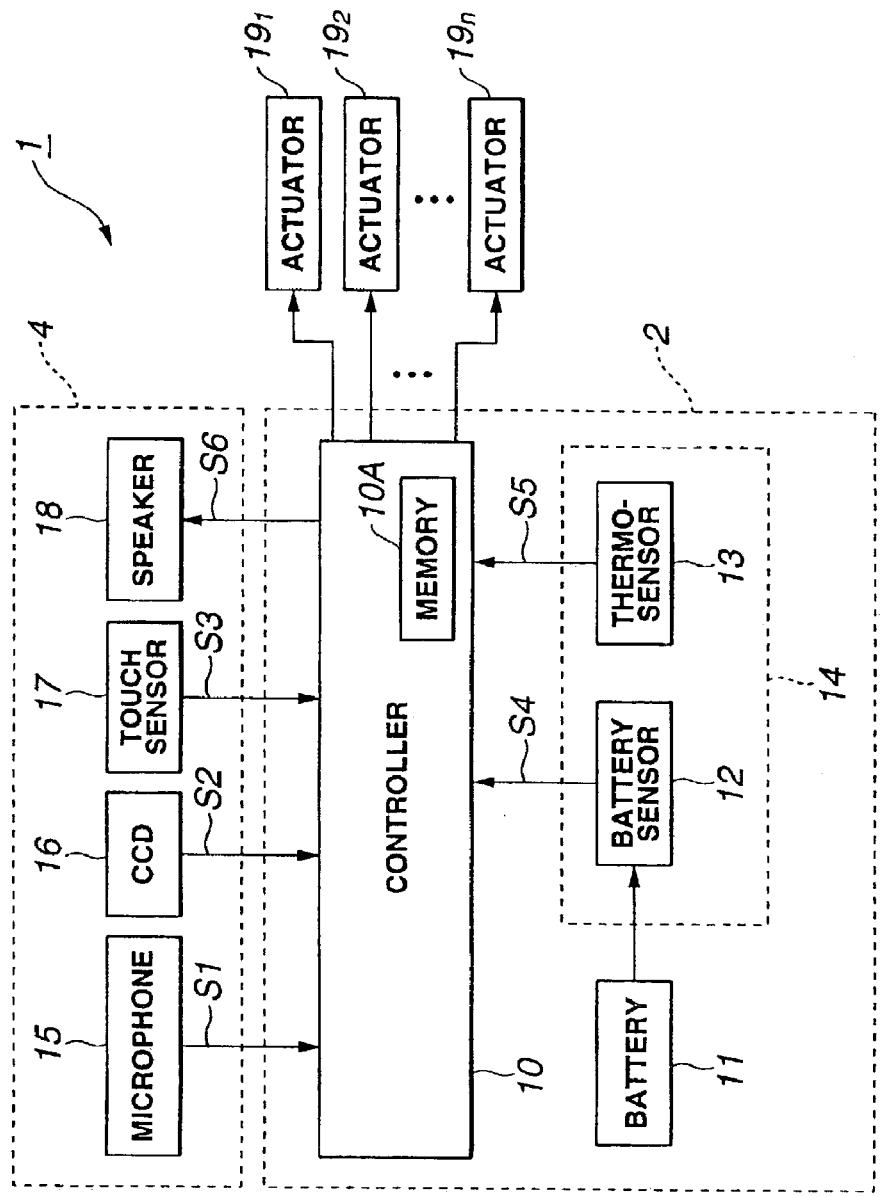
FIG. 2 is a block diagram showing the circuit configuration of the robotic device in FIG. 1.

As shown in FIG. 2, the body unit 2 houses a controller 10 to control the operations of the entire robot 1, a battery 11 to supply a power to the robot 1, an internal sensor unit 14 including a battery sensor 12 and thermo-sensor 13 and others.

The head unit 4 houses a microphone 15 working as "cars" of the robot 2, a CCD (charge coupled device) camera 16 as "eyes", a sensor 17, and a speaker 18 as "mouth", disposed in place, respectively.

Further, actuators $19_1$ to $19_n$ are disposed in joints of the leg units 3A to 3D, articulations between the leg units 3A to 3D and body unit 2, an articulation between the head unit 4 and body unit 2, and in an articulation between the tail unit 5 and body unit 2, respectively.

The microphone 15 in the head unit 4 receives a command sound such as "Walk!", "Be prone!" or "Chase the ball!" given as scales to the robot 1 via a sound commander (not shown) from the user to produce a sound signal S1, and sends the sound signal S1 to the controller 10. Also, the CCD camera 16 captures the environment surrounding the robot 1 to produce an image signal S2, and sends the image signal S2 to the controller 10.

As shown in FIG. 1, the touch sensor 17 is located at the top of the head unit 4. It detects a pressure applied thereto by a physical action of the user such as "patting", "hitting" or the like, and sends the detected pressure as a pressure detection signal S3 to the controller 10.

The battery sensor 12 in the body unit 2 detects the remaining potential in the battery 11, and sends the detected potential as a battery potential detection signal S4 to the controller 10. The thermo-sensor 13 detects the head inside the robot 1 and sends the detected heat as a heat detection signal S5 to the controller 10.

Based on the sound signal S1, image signal S2, pressure detection signal S3, battery potential detection signal S4 and heat detection signal S5 supplied from the microphone 15, CCD camera 16, touch sensor 17, battery sensor 12 and thermosensor 13, respectively, the controller 10 judges in what environment the robot 1 stands, and if the user has made any instruction or any action to the robot 1.

The controller 10 decides how to behave or move based on the result of judgment and a control program including a variety of control parameters stored in a memory 10A in advance, and drives, based on the result of decision, an appropriate one of the actuators $19_1$ to $19_n$ to allow the robot 1 to make a behavior or motion by shaking or nodding the head unit 4, wagging a tail 5A of the tail unit 5 or driving each of the leg units 3A to 3D to walk. In the following, a set of behaviors and motions will be referred to as "action".

Also, the controller 10 supplies a predetermined sound signal S6 to the speaker 18 as necessary to provide a sound based on the sound signal S6 to outside and turn on and off an LED (light emitting diode) (not shown) provided at each "eye" position of the robot 1.

Thus, the robot 1 is adapted to autonomously act based on its environment, control program stored in the memory 10A, etc.

(1-2) Software Configuration of the Control Program

Figure 3:
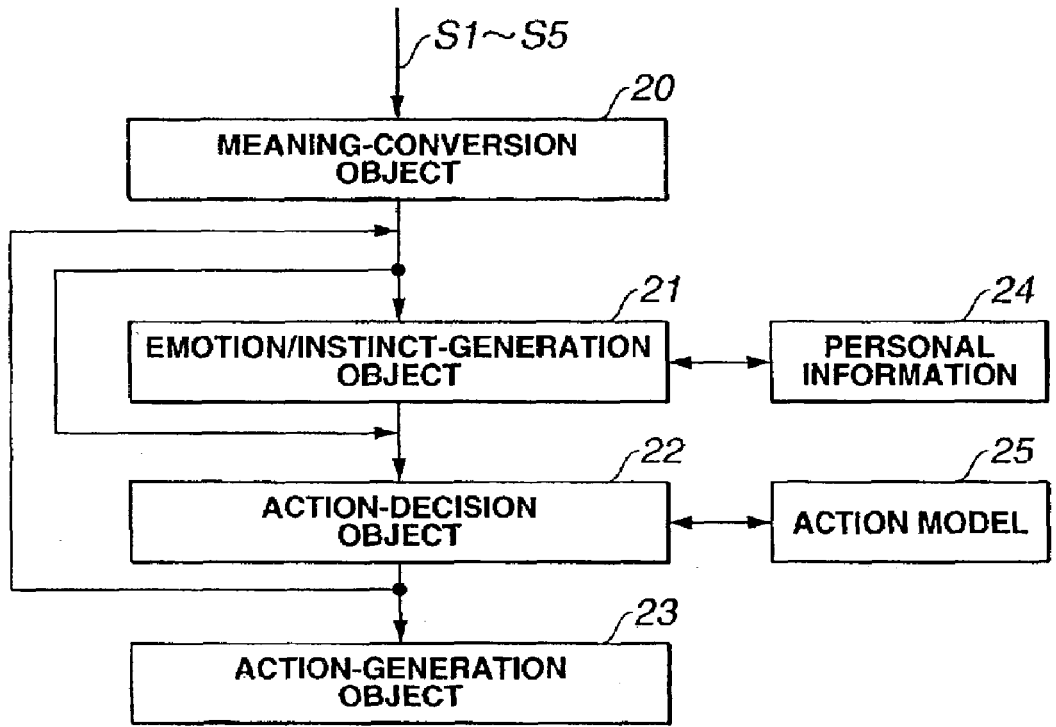
FIG. 3 is a block diagram showing the configuration of a software for the robotic device in FIG. 1.

FIG. 3 shows the software configuration of the above-mentioned control program used in the robot 1. As shown, the control program includes a meaning-conversion object 20, emotion/instinct-generation object 21, action-decision object 22 and an action-generation object 23.

In the above software configuration, the meaning-conversion object 20 recognizes external and internal states of the robot 1. More particularly, the meaning-conversion object 20 recognizes the external and internal states based on results of detection by various sensors. And, the meaning-conversion object 20 supplies the result of recognition to the emotion/instinct-generation object 21 and action-decision object 22.

The emotion/instinct-generation object 21 generates information intended for the robot 1 to express its emotion or instinct by an action. Specifically, the emotion/instinct-generation object 21 decides the states of emotion and instinct based on the result of recognition supplied from the meaning-conversion object 20 and various other information. And, if the emotion or instinct exceeds a predetermined level, the emotion/instinct-generation object 21 supplies it to the action-decision object 22.

The action-decision object 22 decides an action to be done by the robot 1. More particularly, the action-decision object 22 decides a next due action of the robot 1 based on the result of recognition supplied from the meaning-conversion object 20 and information supplied from the emotion/instinct generation object 21. The action-decision object 22 informs the action-generation object 23 of the result of decision.

The action-generation object 23 controls the robot 1 to actually make a behavior or motion. Namely, the action-generation object 23 controls relevant devices of the robot 1 based on the information (result of decision) supplied from the action-decision object 22 to behave or act as specified by the information.

Thus the control program is composed of the above-mentioned plurality of objects to control the operation of the robot 1. Each of the objects will further be described below.

Based on a sound signal S1, image signal S2, pressure detection signal S3, battery potential detection signal S4 or heat detection signal S5 from the microphone 15, CCD camera 16, touch sensor 17, battery sensor 12 and thermosensor 13, respectively, the meaning-conversion object 20 recognizes predetermined external and internal states of the robot 1 such as "the robot 1 has been hit", "the robot 1 has been patted", "the robot 1 has detected the ball", "the battery potential has become lower" or "the internal temperature has been elevated". Then it supplies the result of recognition to the emotion/instinct-generation object 21 and action-decision object 22.

Based on the result of recognition supplied from the meaning-conversion object 20, personal information 24 which is one of the control parameters stored in the memory 10A, and information representing an action having been done and supplied from the action-decision object 22 as will further be described later, the emotion/instinct-generation object 21 decides emotion and instinct levels of the robot 1. When the emotion and instinct levels exceed predetermined ones, the emotion/instinct-generation object 21 supplies the emotion and instinct levels to the action-decision object 22.

More particularly, the emotion/instinct-generation object 21 has an emotion model holding a total of six parameters each representing the strength of emotions including "joy", "sadness", "anger", "surprise", "fear" and "aversion", respectively, and an instinct model holding a total of four parameters representing the strength of desires for "love", "search", "motion" and "eating", respectively.

The memory 10A has also stored therein, as the personal information 24, data such as one of emotion or desire parameters which has to be increased or decreased in value in response to a result of recognition from the meaning-conversion object 20 and information from the action-decision object 22 noticing that an action has been done and which will further be described later and . For example, when the personal information 24 is that the robot 1 has been "hit", the value of the "angry" parameter is increased while that of the "joy" parameter is decreased. When the robot 1 has been "patted", the value of "joy" parameter is increased while that of the "angry" parameter is decreased. When the robot 1 has made an action, the value of the "desire for motion" parameter and that of the "joy" parameter are both increased.

In response to a result of recognition supplied from the meaning-conversion object 20, information supplied from the action-decision object 22, etc., the emotion/instinct-generation object 21 periodically updates the value of an appropriate emotion or desire parameter in the emotion or instinct model on the basis of the personal information.

When as a result of updating of each parameter value, the value of any emotion or desired parameter exceeds a preset value for the emotion or instinct, the emotion/instinct-generation object 21 informs the action-decision object 22 of the fact.

The action-decision object 22 decides a next action based on a result of recognition supplied from the meaning-conversion object 20, information from the emotion/instinct-generation object 21 and an action model 25 which is one of the control parameters stored in the memory 10A, and supplies the action-generation object 23 with the result of decision.

Figure 4:
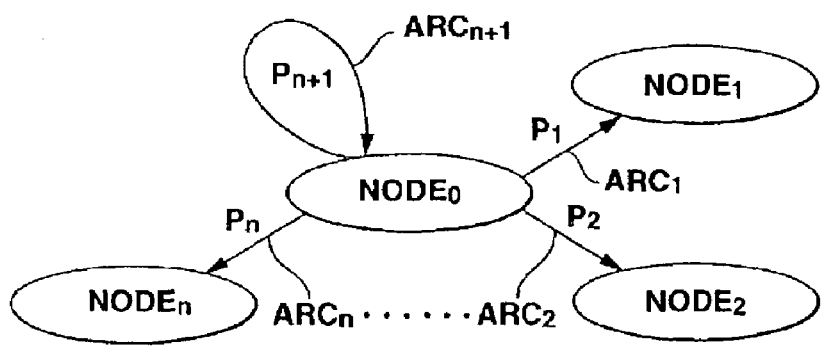
FIG. 4 shows a probabilistic automaton.

Note that in this embodiment of the present invention, the action-decision object 22 adopts, as a measure for decision of a next action, an algorithm called "probabilistic automaton" to stochastically decide one of nodes $NODE_0$ to $NODE_n$ shown in FIG. 4 to which a transition is to be made from the node $NODE_0$, based on transition probabilities $P_1$ to $P_{n+1}$ set for arcs $ARC_1$ to $ARC_{n+1}$, respectively, which provide connections between the nodes $NODE_0$ to $NODE_n$.

More specifically, the memory 10A has stored therein, as the action model 25, a state transition table 26 as shown in FIG. 5 for each of the nodes $NODE_0$ to $NODE_n$. The action-decision project 22 is adapted to set a next action according to the state transition table 26.

That is, in the state transition table 26, input events (results of recognition) taken as conditions for transition between the nodes $NODE_0$ to $NODE_m$ are entered in an "Input event name" column in the order of precedence, and additional conditional data to the transition conditions are entered in "Data name" and "Data range" columns.

Therefore, as shown in the state transition table 26 in FIG. 5, it is a condition for a node $NODE_{100}$ to transit to another node that when a result of recognition that "BALL (the robot 1 has detected the ball)" is given, "SIZE (ball size)" given together with the result of recognition is "0, 1000 (0 to 1000)". Also, the node $NODE_{100}$ can transit to another node when "OBSTACLE (the robot 1 has detected an obstacle)" is given as a result of recognition and "DISTANCE (distance between the obstacle and robot 1)" given along with the result of recognition is "0, 100 (0 to 100)".

Also, the node $NODE_{100}$ can transit to another node when any of the parameters "JOY", "SURPRISE" and "SADNESS" included in the emotion and desire parameters in the emotion and instinct models in the emotion/instinct-generation object 21 to which the action-decision object 22 refers periodically takes a value of "50, 100 (50 to 100)" even with entry of no result of recognition.

In the state transition table 26, names of the nodes to which each of the nodes $NODE_0$ to $NODE_n$ can transit are given in a "Transition destination nodes" line covered by a "Probability of transition to other node (Di)" column, and probabilities of transition to other nodes $NODE_0$ to $NODE_n$, which would be when all the requirements given in the "Input event name", "Data name" and "Date range" columns, respectively, are satisfied are given in an "Output action" line covered by the "Probability of transition to other node (Di)" column. Note that the sum of the transition probabilities in the line covered by the "Probability of transition to other node Di" column is 100 (%).

Therefore, the node $NODE_{100}$ in the state transition table 26 shown in FIG. 5 can transit to a node $NODE_{120}$ (node 120) with a transition probability of "30%" when "BALL (the ball has been detected)" is given as a result of recognition and "SIZE (the size of the ball)" given along with the result of recognition is "0, 1000 (0 to 1000)". At this time, the robot 1 will make an action "ACTION 1".

The action model 25 is constructed so that many of the nodes $NODE_0$ to $NODE_n$ given in the state transition table 26 are connected to each other. When a result of recognition is supplied from the meaning-conversion object 20 or when a notice is supplied from the emotion/instinct-generation object 21, the action-decision object 22 is adapted to stochastically decide a next action or motion by using the state transition table 26 stored in the memory 10A for appropriate ones of the nodes $NODE_0$ to $NODE_n$ and inform the action-generation object 23 of the result of decision.

The action-generation object 23 drives and controls an appropriate one of the actuators $19_1$ to $19_n$ as necessary based on the information from the action-decision object 22 for the robot 1 to act or move as specified, generates an appropriate sound signal S6 (as shown in FIG. 2) based on a corresponding sound data in a sound data file which is one of the control parameters stored in the memory 10A, and sends it to the speaker 18, or turns on and off the LED at the "eye" position in a corresponding light-emission pattern on the basis of a corresponding light emission data in a light emission data file which is one of the control parameters stored in the memory 10A.

Thus, the robot 1 can make an autonomous action correspondingly to its own state and surrounding environment, and a user's instruction and operation made to the robot 1 on the basis of the control program.

Next, the growth model incorporated in the robot 1 to have the latter act in each of its growth steps will be described.

The growth model is to allow the robot 1 to show an "advanced action" in each higher "growth" step like a real animal on which the robot 1 is modeled.

Namely, the growth model allows the robot 1 to make an action corresponding to each level of growth (degree of growth). More specifically, the robot 1 is designed to act in each of four "growth steps" including "infancy", "boyhood", "adolescence" and "adulthood" according to the growth model.

The growth model includes the above-mentioned action model (action-decision object) for each of the four "growth steps" including "infancy", "boyhood", "adolescence" and "adulthood". A model corresponding to each growth step is selected to have the robot 1 act correspondingly to its step of growth. For example, a difference between two successive ones of the "growth steps" in the growth model is such that an action or motion in a higher growth step is more difficult or complicated than in the precedent growth step.

More specifically, the action model for the "infancy" is such that for example "walking" is "toddling" with short steps and "motions" are "simple" ones such as "toddle", "stand", "lie" and the like. "Action" is a "monotonous" one such as repetition of a motion, and "sound" is a "low and short" one amplified by a low factor.

A transition is made from one to another step of growth by always monitoring and counting occurrence of a plurality of elements (will be referred to as "growth element" hereunder) associated with a predetermined "growth" such as a predetermined action and motion.

More particularly, when a sum of cumulative occurrences of each growth element (will be referred to as "total empirical value of growth element" hereunder) in which the cumulative occurrences (count) of the growth element are taken as information indicative of a growth degree of the growth element, exceeds a preset threshold, another action model is selected for use, that is, a transition is made from for example the "infancy" action model to the "boyhood" one which higher in growth level (difficulty and complexity of action or motion) than the "infancy" action model, thereby allowing a transition to a next growth step.

It should be reminded here that the growth elements include for example input of a command by scale from a sound commander (in a remote controller), input of "padding" and "hitting" from the touch sensor 17, intensified learning including a number of successes in a predetermined action and motion, input of other than "padding" and "hitting" from the touch sensor 17, and a predetermined action and motion such as "playing with a ball".

Then, after transition of the growth step from the "infancy" action model, the action model for the "boyhood" is followed to control the actuators $19_1$ to $19_n$ and sound output from the speaker 18 in order to increase the rotation speed of each of the actuators $19_1$ to $19_n$ for a "little more positive" walking, increase the number of "motions" for a "little more advanced and complicate" motion, decide a next "action" with reference to the preceding "action" for an "action with a little more definite intention", and increase the length of "sound" signal and amplify the signal with an increased factor for a "little longer and louder" cry.

Similarly, each time the total empirical value of the growth element exceeds each of thresholds preset for the "adolescence" and "adulthood" after transition through the "boyhood", the action model is sequentially changed to the "adolescence" or "adulthood" higher in "growth step" than the "boyhood" and each of these action models is followed to gradually increase the rotation speed of the actuators $19_1$ to $19_n$ and the length and amplification factor of a sound signal supplied to the speaker 18.

Following the growth model, the robot 1 "toddling" in its "infancy" can "walk more positively" as the "growth step" rises (namely, the action model transits from the "infancy" to the "boyhood", from the "boyhood" to the "adolescence", and from the "adolescence" to "adulthood"), the robot 1 "moving simply" in its "infancy" can "move in a more advanced and complicated manner", and the robot 1 acting "monotonously" in its "infancy" can "act with an intention". Also, the robot 1 can generate a "longer and louder" sound as it grows while it has made a "low and short" sound in its "infancy".

Following the growth model, the robot 1 can make an autonomous action in each of the growth steps correspondingly to its own state and surrounding environment and user's instruction and action made to the robot 1.

(2) Construction of a Network System 30

Figure 6:
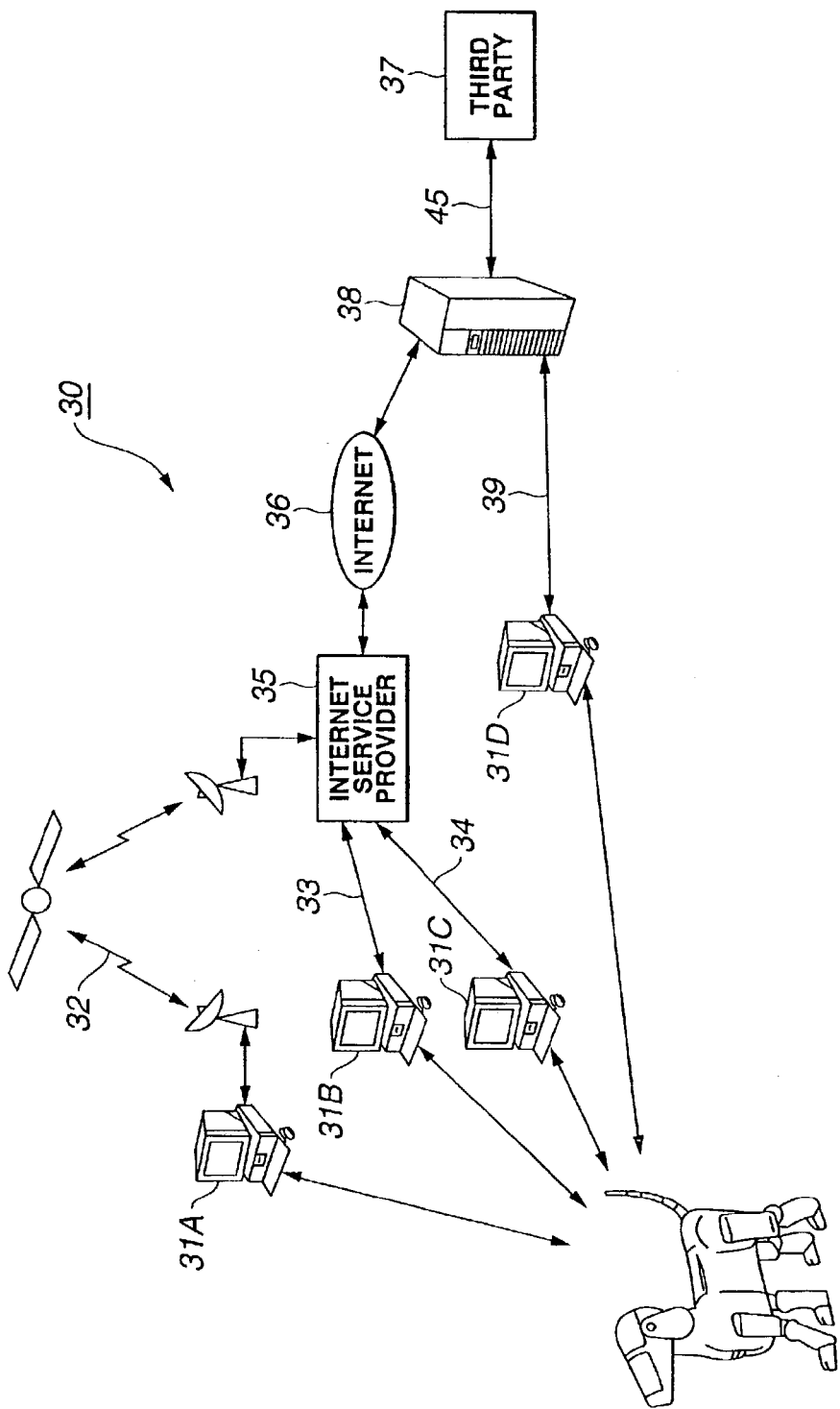
FIG. 6 is a block diagram of the network system according to the present invention.

A network system 30 which implements the information service system according to the present invention will be described herebelow with reference to FIG. 6.

In this network system 30, personal terminal devices 31A to 31C are connected to an Internet service provider 35 by a satellite communication line 32, cable television line 33 or telephone line 34 as shown. Also, the Internet service provider 35 is connected to a server 38 via an Internet 36, and a personal terminal device 31D is connected directly to the server 38 by an ordinary public network 39.

Each of the personal terminal devices 31A to 31D is an ordinary personal computer installed in ordinary homes, and communicates with the server 38 via the Internet 36 or the ordinary public network 39 to transmit and receive necessary data to and from the server 38.

Also, the server 38 is a Web server available from a manufacturer or distributor of the robot, for example. It sends a variety of information such as image data etc. to personal terminal devices 31A to 31D having accessed the server 38 via the Internet 36 or ordinary public network 39.

Figure 7:
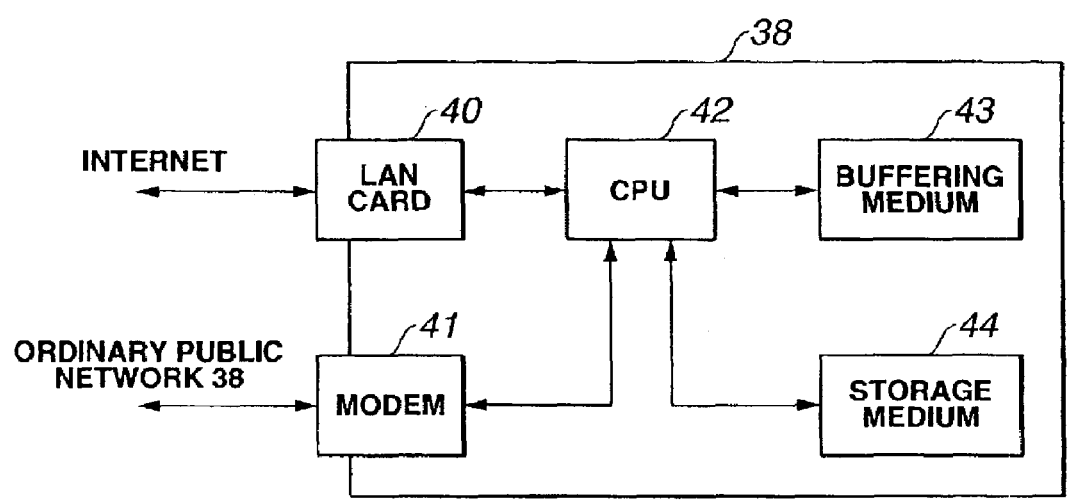
FIG. 7 is a schematic block diagram of the information server.

The server 38 is constructed as shown by way of example in FIG. 7. As seen, the server 38 includes a LAN (local area network) card 40 incorporating an interface circuit via which the server 38 interfaces with the Internet 36, modem 41 via which the server 38 interfaces with the ordinary public network 39, CPU 42 which controls the entire server 38, temporary storage medium 43 formed from a semiconductor memory which serves as a work memory of the CPU 42, and a storage medium 44 such as a hard disc drive having stored therein various data which are used for the server 3 to perform processing operations as will further be described later.

In the server 38, data and command supplied from the personal terminal devices 31A to 31D having accessed the server 38 via the Internet 36 or ordinary public network 39 are taken into the CPU 42 through the LAN card 40 or modem 41, and a predetermined processing operation is performed based on the data and command and control information stored in the storage medium 44.

The CPU 42 generates on-screen data to be displayed on an appropriate screen for a result of the above processing operation as necessary, and sends it to an appropriate one of the personal terminal devices 31A to 31D through the LAN card 40 or modem 41.

The above server 38 sends a variety of information such as on-screen data to the personal terminal devices 31A to 31D having accessed the server 38 via the above-mentioned information communication network which utilizes a telecommunication line, while acquiring information from the personal terminal devices 31A to 31D and processing the information appropriately. More specifically, the server 38 sends, to the personal terminal devices 31A to 31D, on-screen options information for selection of components/devices/accessories. Also, the server 38 receives component/device/accessory selection information included in the on-screen options information from the personal terminal devices 31A to 31D, and narrow down the potential components/devices/accessories on the basis of the component/device/accessory selection information. This will further be described below.

The server 38 has connected thereto a so-called third party 37 including manufacturers or distributors of the components/devices/accessories of the robot 1 via the telecommunication line 45. Note that the third part 37 is not any manufacturer of the robot itself but an developer/distributor of the components/devices/accessories of the robot, which provides components/devices/accessories information (accessories information) via an information communication network.

The information service system according to the present invention is organized in the aforementioned network system 30. In the information service system, the personal terminal devices 31A to 31C form communication terminal devices connected to the information communication network via the telecommunication line, the server 38 is connected to the information communication network via the telecommunication line. Thus the information communication network forms an information management unit cumulatively store components/devices/accessories information on components/devices/accessories available from the plurality of manufacturers or distributors of the components/devices/accessories of the robot 1, as classified according to their attributes. When any of the personal terminal devices 31A to 31C is connected to the information communication network (information management unit), sends, to the one of the personal terminal devices 31A to 31C, options information prepared based on the attributes of the cumulatively stored components/devices/accessories and including a plurality of options for component/device/accessory selection.

Also, the third party 37 connected to the server 38 provides the information on the components/devices/accessories of the robot 1 to the server 38 via the telecommunication line. When a component/device/accessory is selected at any of the personal terminal devices 31A to 31C based on the options information (on-screen options information), the third part 37 is informed from the server 38 that the component/device/accessory in consideration will be shipped to a user (of the personal terminal device) having selected it.

Figure 8:
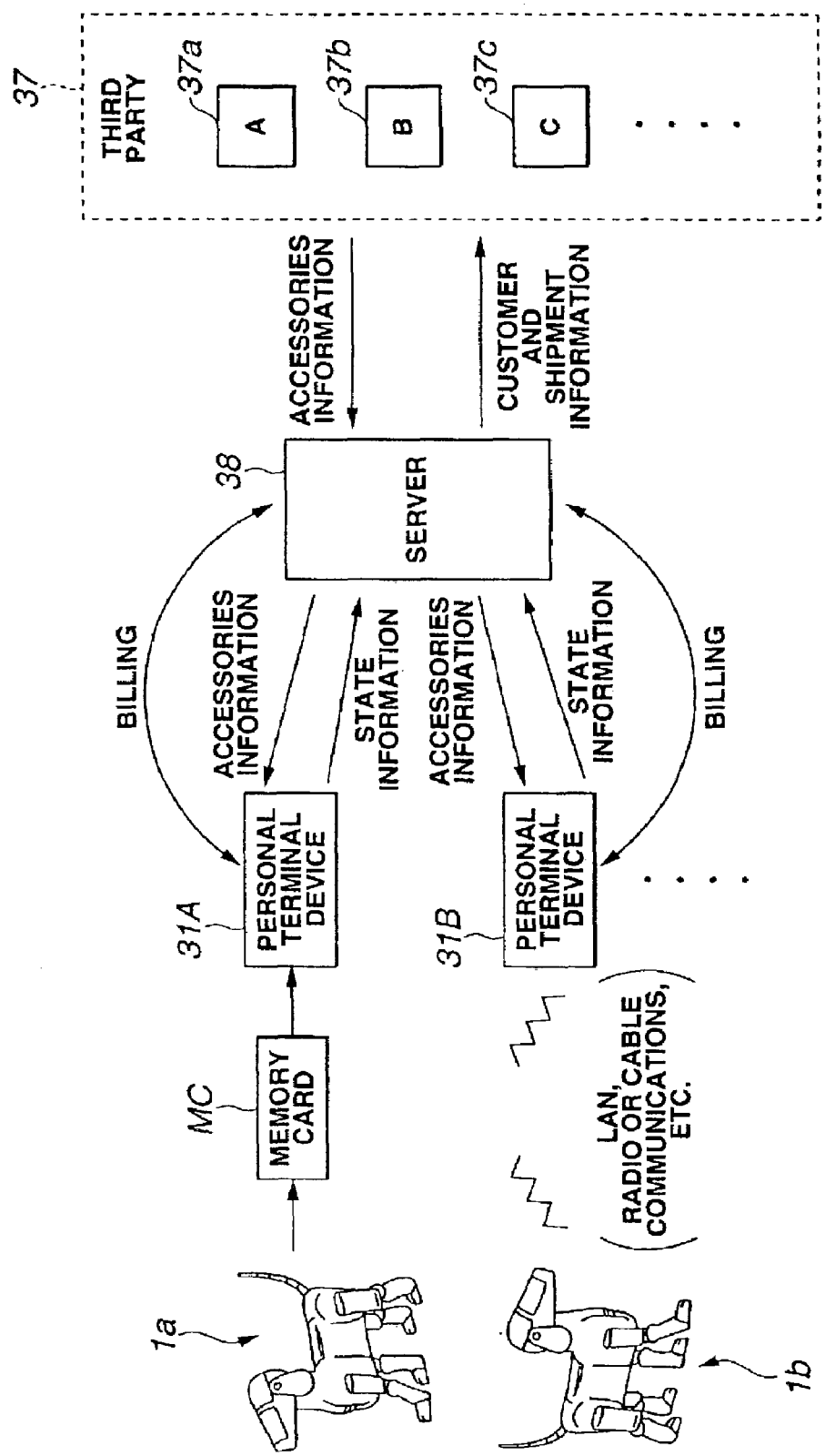
FIG. 8 is a block diagram of the information service system according to the present invention.

As shown in FIG. 8, in the information service system, components/devices/accessories information (accessories information) on the components/devices/accessories of the robot 1, provided from the third party 37, is stored in the server 38, the server 38 sends, to the personal terminal devices 31A to 31C, the on-screen options information (options information) for selection of robot components/devices/accessories, having been prepared based on the stored components/devices/accessories information (accessories information), and any of the components/devices/accessories of the robot 1 is selected at any of the personal terminal devices 31A to 31C on the basis of the on-screen options information sent from the server 38. When it is selected to purchase a component/device/accessory at the one of the personal terminal devices 31A to 31C, customer/shipment information including information on the user of the personal terminal device in consideration and information that the selected component/device/accessory has to be shipped is provided from the server 38 to an appropriate one of the manufacturers or distributors included in the third party 37. The manufacturer will ship the selected component/device/accessory based on the customer/shipment information.

Figure 9:
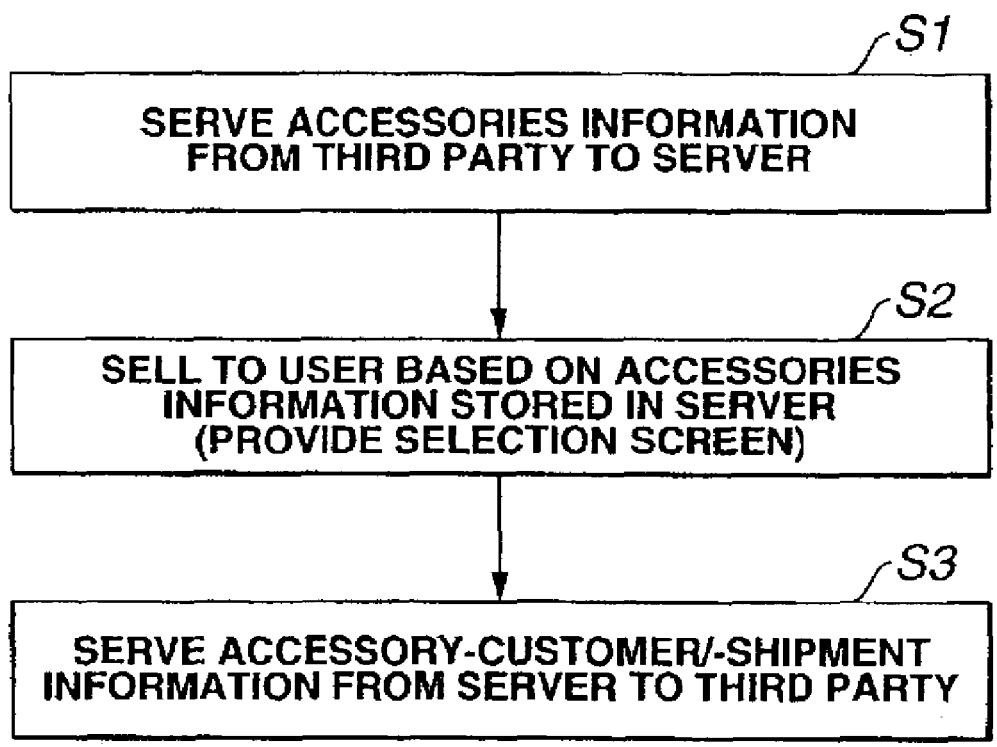
FIG. 9 is a chart showing an flow of operations effected for distribution of components/devices/accessories over the information service system in FIG. 8.

(3) Distribution of Robot Component/Device/Accessory Over the Information Service System The processing operations effected in the network system 30 when a component/device/accessory of the robotic device is distributed over the information service system according to the present invention, will be described herebelow. As shown in FIG. 9, the processing operations effected in the network system 30 includes (1) Service of components/devices/accessories information (accessories information) from the third party 37 to the server 38 (step S1), (2) Service of information which is based on the components/devices/accessories information stored in the server 38 to the users via the personal terminal devices 31A to 31C (step S2), (3) Procedure to be done when an order for a robot component/device/accessory is made from any of the personal terminal devices 31A to 31C, whichever is operated for the purpose of purchase (step S3). These operations will be described in detail below.

(3-1) Service of Components/Devices/Accessories Information from the Third Party to the Server As shown in FIG. 8, the third party 37 includes developers/distributors (manufacturer) 37a, 37b and 37c of the components/devices/accessories of the robot. For example, the manufacturers 37a, 37b and 37c develop/manufacture software or hardware of the robot. In the third party 37, the manufacturer 37a develops/manufactures tail units of the robot, the manufacturer 37b develops/manufactures motors used to drive the robot, and the manufacturer 37c develops/manufactures costumes which are to be put, as a part of the robot, on the body unit of the robot, as shown in FIG. 10.

Figure 10:
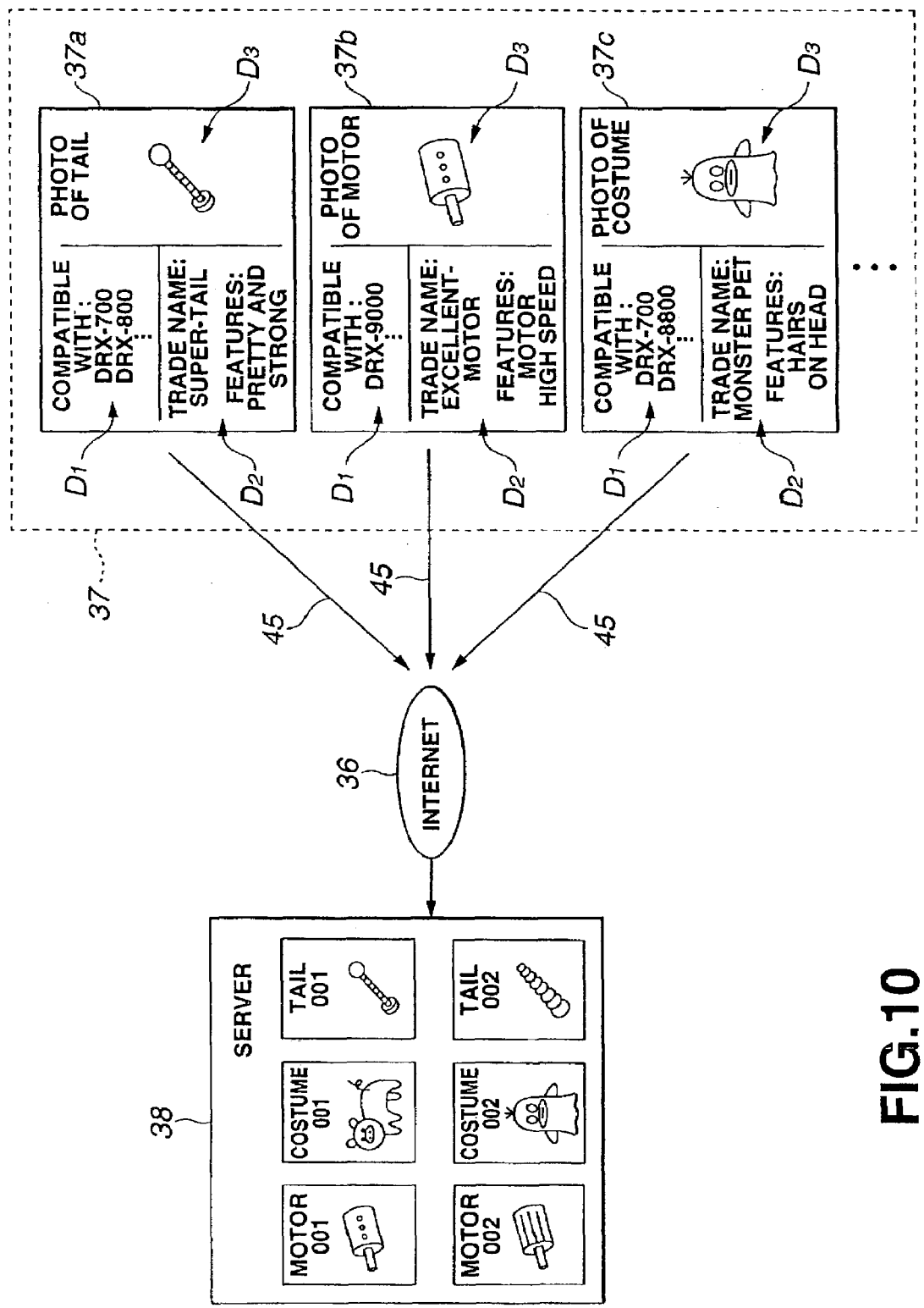
FIG. 10 is a block diagram intended for explanation of accessories information (components/devices/accessories information) transmitted from a third party to the server.

The manufacturers 37a, 37b and 37c provide the server 38 with information on robot components/devices/accessories produced by them (accessories information) via an information communication network such as the Internet connected by the telecommunication line 45 as shown in FIGS. 8 to 10.

As shown in FIG. 10, these manufacturers 37a, 37b and 37c provide the server 38 with components/devices/accessories information such as information $D_1$ on model numbers of the robots with which the components/devices/accessories available from the manufacturers are compatible, information $D_2$ on trade names and features, and photographic information $D_3$ (image data) on the components/devices/accessories the manufacturers desire to sell.

The server 38 cumulatively stores the components/devices/accessories information supplied from the manufacturers 37a, 37b and 37c. More specifically, the supplied components/devices/accessories are cumulatively stored as classified according to the attributes of the components/devices/accessories such as parts of the robots at which the components/devices/accessories are to be used, characteristics (performances) of the components/devices/accessories, model numbers of the robots with which the components/devices/accessories are compatible, etc. The components/devices/accessories information is served to the users via the personal terminal devices 31A to 31C on the basis of the thus stored information.

Also, the third party 37 may be arranged so that the manufacturers 37a, 37b and 37c cannot join the third party 37 without being registered as a member of the third party and paying a registration fee.

Figure 11:
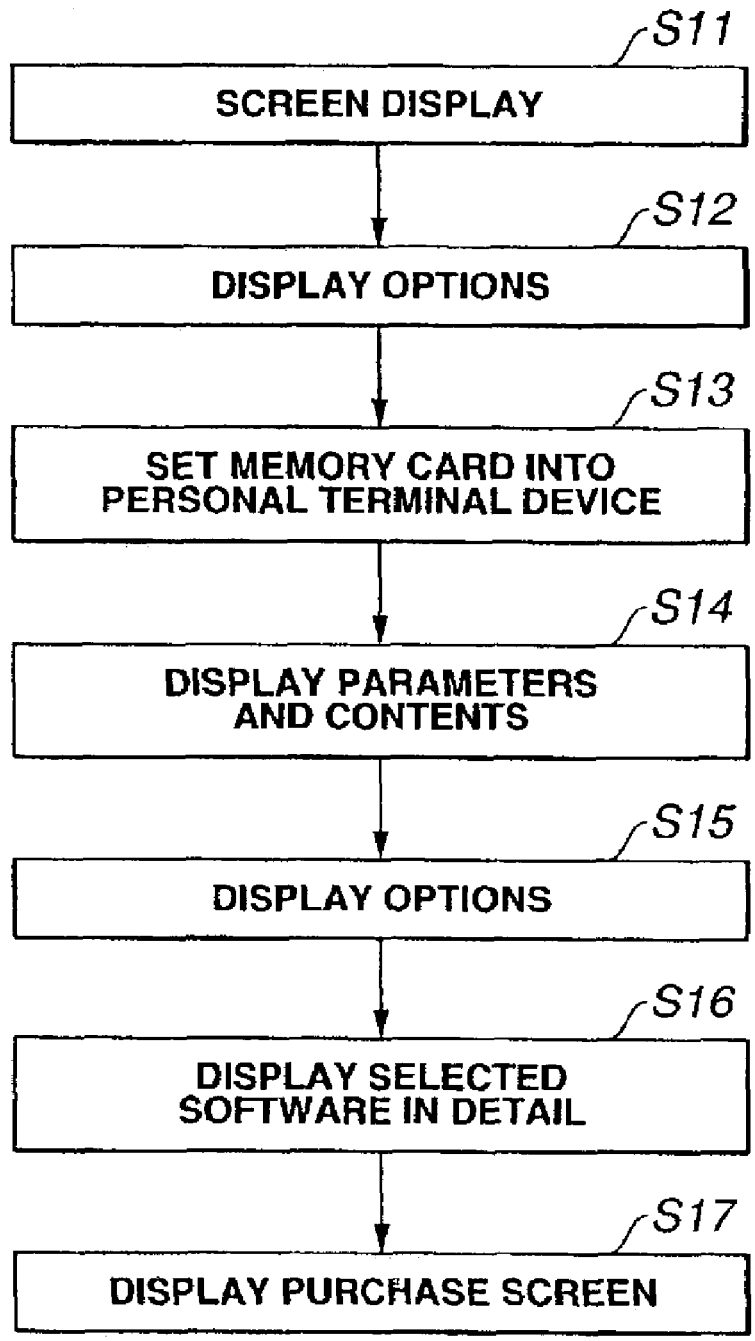
FIG. 11 is a chart showing a flow of operations effected at the server and an personal terminal device for purchase of a component/device/accessory over the information service system in FIG. 8.

(3-2) Service of Information to the User Via the Personal Terminal Devices Based on Components/Devices/Accessories Information Stored in the Server Components/devices/accessories information is served from the server 38 to the personal terminal devices 31A to 31C in a procedure as shown in FIG. 11.

First, when any of the personal terminal devices 31A to 31C accesses a Web page or the like intended for purchase of robot components/devices/accessories and served from the server 38, the Web page is displayed on the screen of a monitor at the one of the personal terminal devices 31A to 31C in step S11. For example, a top page is displayed. In next step S12, itemized options are displayed on the monitor screen.

Figure 12:
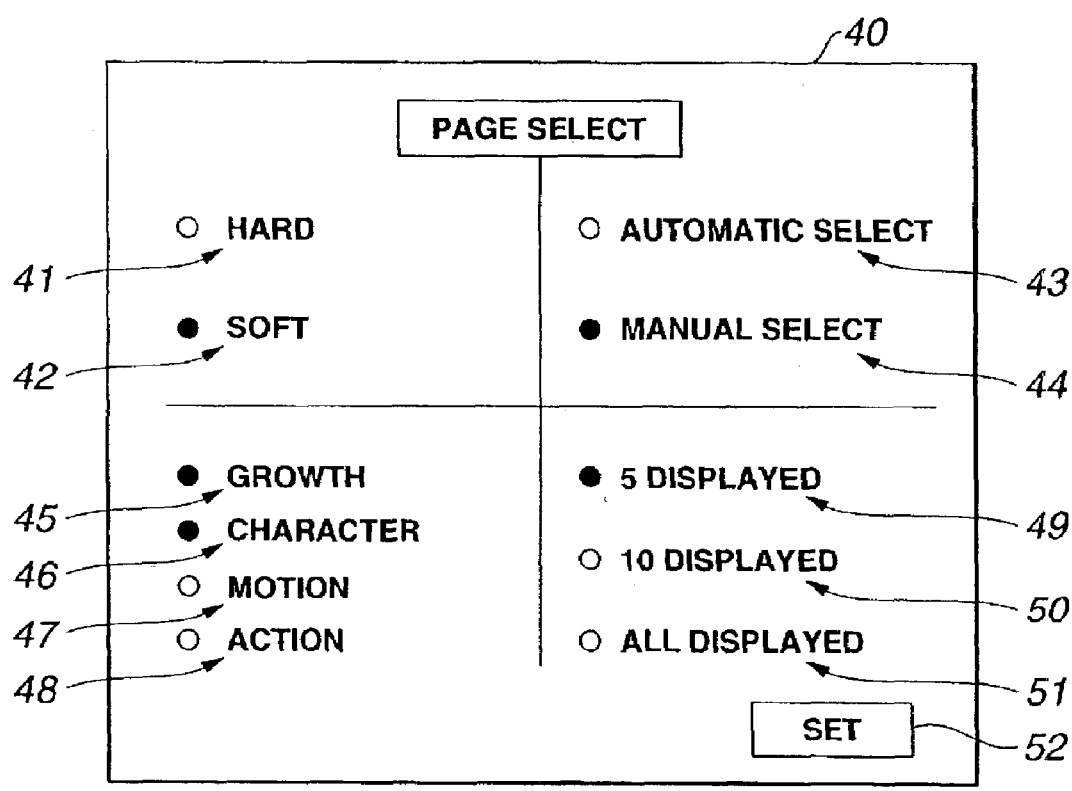
FIG. 12 is a plan view of a display of options on a monitor screen at the personal terminal device.
Figure 13A:
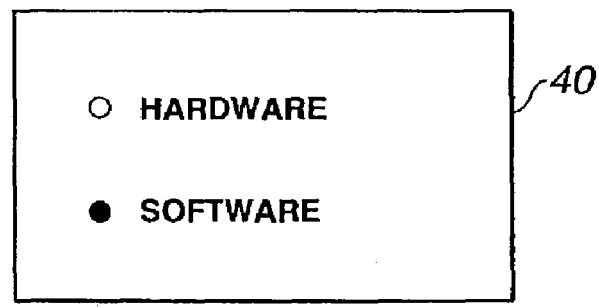
FIGS. 13A, 13B, 13C, and 13D are plan views of screen displays for each type of the options.
Figure 13B:
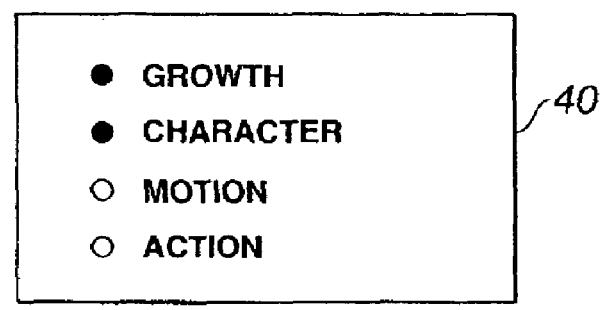
Figure 13C:
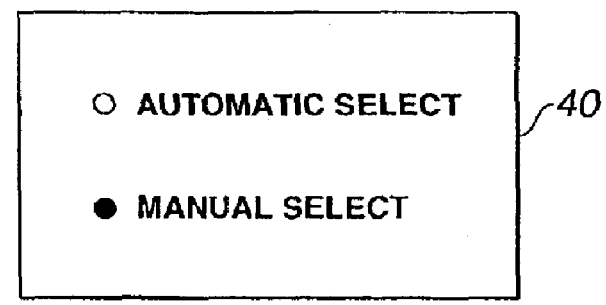
Figure 13D:
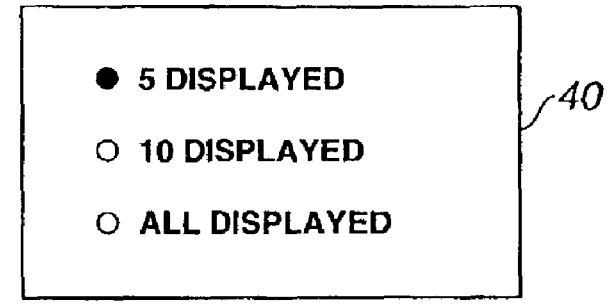

The options display includes a plurality of itemized options from which the user can select an appropriate component, as shown in FIG. 12. More specifically, the items displayed on a screen 40 include "Hard" 41 indicating that a component/device/accessory the user wants to purchase is a hardware or "Soft" 42 indicating that the desired component/device/accessory is a software, "Automatic select" 43 indicating that the component/device/accessory selection is automatically done or "Manual select" 43 indicating that the component/device/accessory selection is manually done, "Growth" 45, "Character" 46, "Motion" 47 and "Action" 48 indicating which components/devices/accessories of the robot the user wants to purchase, respectively, and "5 displayed" 49, "10 displayed" 50 and "all displayed" 51 indicating numbers of components/devices/accessories, respectively, which are to be displayed depending upon a final narrow-down of the potential components/devices/accessories.

Thus, the options are displayed on the monitor screen 40 at the personal terminal device 31 and the user will select desired ones of the thus itemized options on the screen 40. In the illustrated example, the "Soft" 42, "Manual select" 44, "Growth" 45, "Character" 46 and "5 displayed" 49 are selected, which means that software for the growth and character will be manually selected, and the thus narrowed-down five kinds of software will be displayed.

Then, pressing a "SET" button 52 will decide the selection of the items. With this item selection, the server 38 prepares optimum information on the options for the user in selecting the robot components/devices/accessories elaborately.

Owing to the display of the items in plural kinds all together on the display screen 40, the user can select robot components/devices/accessories without feeling troublesome. That is, if the items are displayed over more than one page, switchable from one to another for viewing, on the display screen 40 for user's selection as shown in FIGS. 13A to 13D, the user will be feel annoyed with the information served from the server 38 and intended to select his desired components/devices/accessories. However, display of the itemized options as in FIG. 12 will permit the user to select his desired components/devices/accessories without feeling such an annoyance.

In next step S13, the user inserts a memory card into his personal terminal device 31 to upload state information of the robot 1 to the server 38. The state information is intended for the robot 1 to autonomously decide an action, and more specifically, it includes a state of emotion to express an emotion by an action (emotion parameter), a state of instinct to express an instinct by an action (desire parameter), etc.

The robot 1 holds such state information while updating it in the memory card, and uploads state information stored in the memory card MC to the server 38 via the personal terminal device 31A for example as shown in FIG. 8. As the memory card, there is commercially available a so-called "Memory Stick" (trademark of a memory card (product) from the Sony).

Note however that supply of the state information of the robot 1 to the personal terminal devices 31A to 31C is not limited to the use of the memory card MC but the state information of a robot 1b can be supplied to the personal terminal device 31B via a LAN or a radio or cable communication as shown in FIG. 8. For example, the robot is provided with a PC card slot and sends the state information to the personal terminal devices 31A to 31C via a radio communication from a radio LAN card set in the PC card slot.

Also, it is possible to upload the state information of the robot 1 to the server 38 by a so-called station having both functions to charge the battery in the robot 1 and make communications (modem function). For example, the station on which the robot 1 is placed charges the battery of the robot 1 while connecting to an information communication network to upload the state information on the robot 1 to the server 38.

Figure 14:
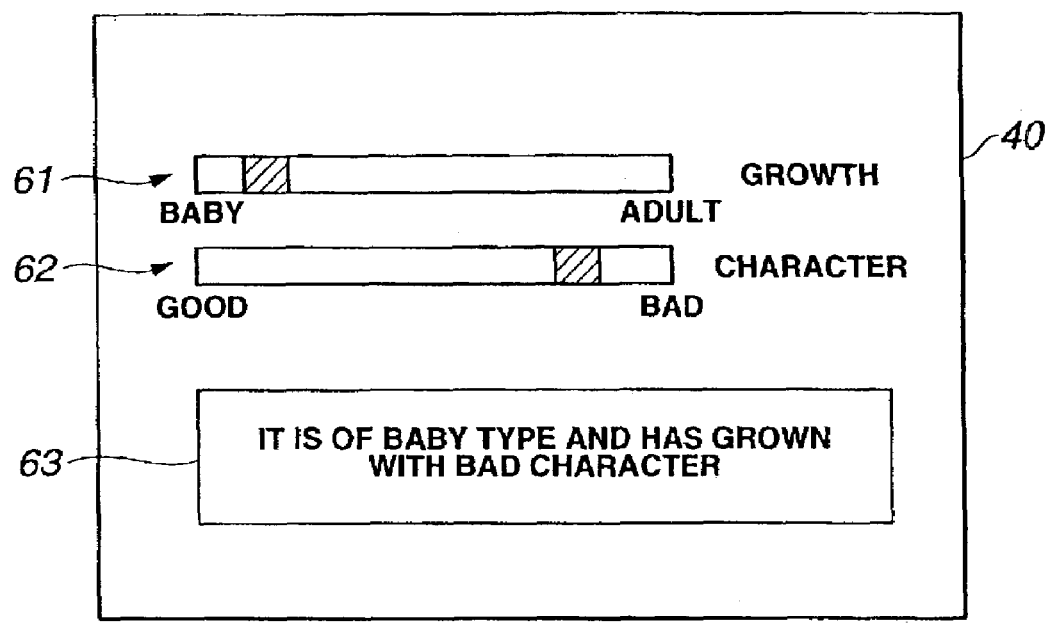
FIG. 14 is a plan view of a screen display showing parameters and a comment on the basis of information on the state information of the robotic device.

In next step S14, the server 38 indicates the state (parameters) of the robot 1 based on the state information of the robot 1, having been uploaded from the personal terminal devices 31A to 31C. More specifically, the server 38 provides a parameter indication 61 for the current state of growth of the robot 1 and a parameter indication 62 for the state of character, as shown in FIG. 14. Also, the server 38 indicates a comment 63 "it is of a baby type and has grown with bad character" or the like about the robot 1 having the above states. The parameter indications 61 and 62 and comment 63 based on the state information reflect the results of selection of "growth" 45 and "character" 46 from the above options, and will be a prompt on which software the user should purchase for the "growth" and "character". Also, since the state information is internal information and so the user cannot know its content, it will be auxiliary information for effective component/device/accessory selection, which can be obtained only by access to the server 38.

Note that if the "motion" 46 and "action" 48 have been selected as desired ones from the aforementioned options, current parameters of the robot based on corresponding state information will be indicated.

Figure 15:
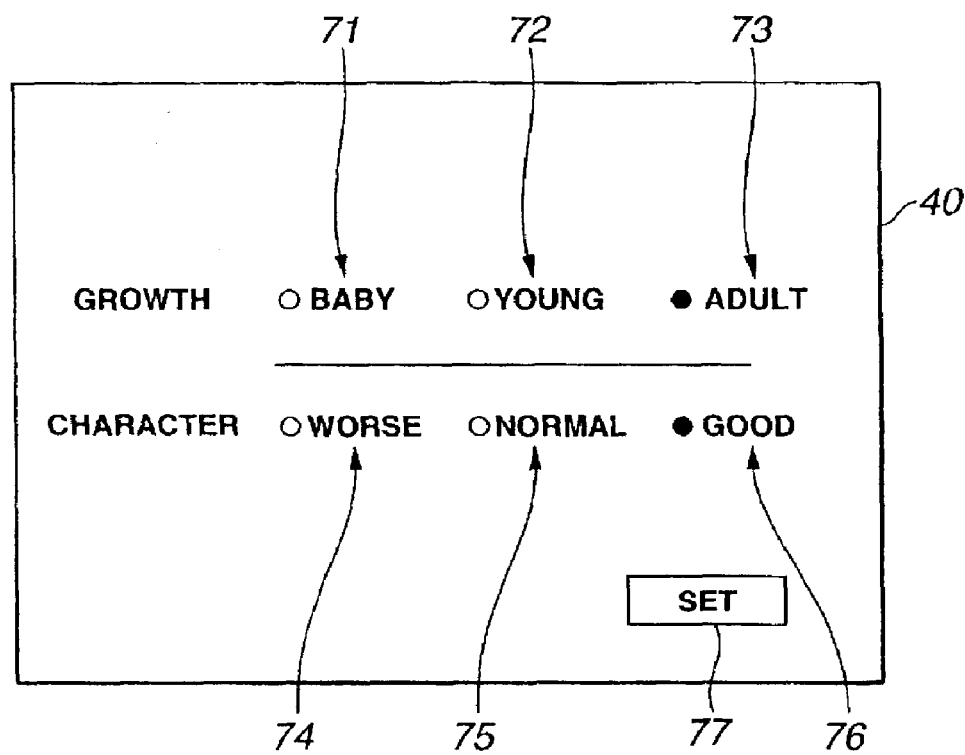
FIG. 15 is a plan view of a screen display showing options based on the state information of the robotic device in FIG. 1.

In step S15, options are displayed on the screen 40 as shown in FIG. 15.

More particularly, the screen 40 displays "Baby" 71, "Young" 72 and "Adult" 73, which are options selectable for the "Growth" 45, and "Worse" 74, "Normal" 75 and "Good" 76, which are options selectable for the "Character" 46. On the screen 40, these items are displayed when the options "Growth" 45 and "Character" 46 having been displayed at step S12 are selected, respectively.

The user operates his personal terminal device to select any of the options. In this example, the "Adult" 73 is selected for the "Growth" 45 and "Good" 76 is selected for the "Character" 46. These selections will result in an indication of "Baby" type in the "Growth" parameter indication 61, "Bad" in the "Character" parameter indication 62, and "It is of baby type and has grown with bad character" in the comment 63. That is, the indications reflect the selections made by the user.

Also these options can reflect the state information taken from the robot 1. More specifically, in this example, since the growth parameter of the robot 1 is "Baby type", the options "Baby" 71, "Young" 72 and "Adult" 73 are indicated. However, when the growth parameter is an "Adult type", the selectable range of growth options can be extended up to "Old". Also, in this example, since the character parameter of the robot 1 is "Bad", the options "Worse" 74, "Normal" 75 and "Good" 76 are indicated. However, when the character parameter is "Good", the selectable range of the character options can be extended to "Better" and "Best".

When any options are selected in this way and the "SET" button 77 is pressed, the selected options are set. With the selection of the options, the server 38 makes a final narrow-down of the potential components/devices/accessories. In step S16, five pieces of software reflecting the result of the previous selection of "5 displayed" 49 from the options are displayed. For example, detailed information on the five pieces of "Growth" and "Character" software, finally narrowed down correspondingly to the selected options, are displayed on the screen 40. When the items "Adult" 73 and "Good" 76 are selected as shown in FIG. 15, five pieces of software based on information such as "Adult" 73 and "Good" 76 are displayed on the screen 40.

Figure 16:
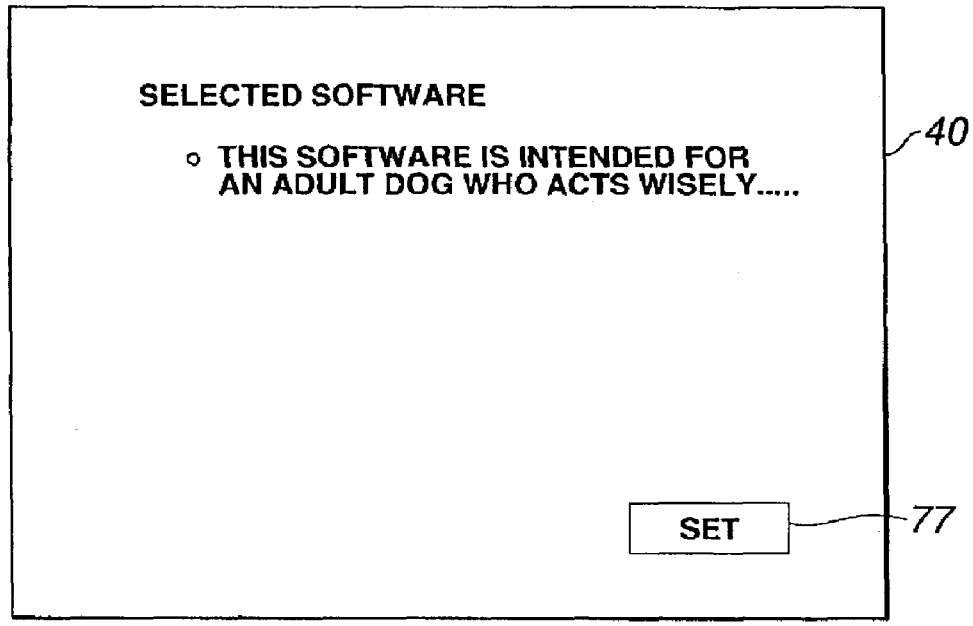
FIG. 16 is a plan view of a screen display showing information on a software defined by selecting the options.

When the user selects one of the finally narrowed-down pieces of software, a characteristic or the like of the robot 1, which will be implemented by that software, is displayed on the screen 40. For example, such a characteristic or the like of the robot 1, which will be implemented by that software, that "This software is intended for an adult dog who acts wisely . . . " is displayed as shown in FIG. 16. When the user sees the contents of the software and presses the "SET" button 78 to decide the selection of the options, the monitor screen 40 will provide a purchase screen in step S17. The purchase screen provides an information input screen for methods of payment, methods of component/device/accessory delivery, etc., and the user will make a purchase procedure according to those instructions displayed on the screen.

For example, a user having already registered his own information in the server 38 can make a purchase procedure by making an entry of his ID or the like at his personal terminal device.

Generally, a user will make a user registration in the server 38 at the time of purchasing a robot. So, the user can make a procedure for purchase of robot components/devices/accessories by the use of his own information having already been registered, for example, his name, address and the like. Therefore, the user can easily make a procedure for purchase of components/devices/accessories for his robot without having to make any complicated procedure. On the other hand, the server 38 will cumulatively store information on the purchase by the users as user data base in correlation with the user ID and the like.

After an order for a component/device/accessory for the robot 1 is made to the server 38 by the user operating his personal terminal device (31A to 31C), an ordering for the component/device/accessory will be made to the third party 37.

Note that the present invention is not limited to the aforementioned manners of screen display. For example, the parameter indications 61 and 62 as shown in FIG. 14 may be provided along with the options as shown in FIG. 15 on the same screen. That is, the options information is served over more than one page as in the above, but pieces of information which could be displayed together are displayed on the same page as far as possible. On the other hand, pieces of component-selection information which could not be displayed together are displayed separately. That is to say, the pieces of information as shown in FIGS. 14 and 15 are displayed to reflect the information on the selection of options as shown in FIG. 12. Such a screen display will permit the user to select desired components/devices/accessories without feeling troublesome.

Note that when the "Manual select" 44 to decide a method of component/device/accessory selection is selected in the options screen 40 as shown in FIG. 12, pieces of components/devices/accessories information stored at the server 38 are retrieved one by one without display any information helpful for the use to select his desired components/devices/accessories. For example, such retrieval can be done according to component/device/accessory names by using a retrieval system provided at an ordinary Web site. Such component/device/accessory retrieval by the manual selection can be said to be "maniac-oriented (heavy user-oriented)". With the manual selection mode, the user can thoroughly check the characteristics and the like of many components/devices/accessories before deciding to select any of the components/devices/accessories. In other words, the aforementioned "Automatic select" 43 is intended for the server 38 to narrow down potential components/devices/accessories to some extent to guide the user for the selection of components/devices/accessories. Namely, the "Automatic select" 43 is suitable for the beginners.

(3-3) Procedure to be Made When an Order has been Issued for a Robot Component

A procedure for ordering (shipment) for a component/device/accessory is effected by supplying customer/shipment information from the server 38 to an appropriate one of the manufacturers included in the third party 37 via an information communication network such as the Internet or the like as shown in FIG. 8.

The customer/shipment information includes information of the ordering and requisite information for delivery of the ordered component/device/accessory such as the name and address of the customer having ordered for the component.

The third party 37 will make a procedure for shipment of the order component/device/accessory based on the customer/shipment information, and the user will receive his ordered component/device/accessory delivered, by transportation or otherwise, from the third party 37.

The payment for the component/device/accessory is made by billing by way of example. For instance, the billing is made between the server 38 and user, and a money is paid from the server 38 to the third party 37. At this time, the server 38 will pay a rest after subtraction of a brokerage from the payment for the component. Thus, the server (including the manufacturer in consideration) 38 can gain the previously mentioned registration fee the third party 37 pays to the server 38 and also the fee for the distribution brokerage for the third party 37.

As having been previously described, the information service system according to the present invention permits to distribute robot components/devices/accessories over the information communication network.

With such a distribution system including the information service system according to the present invention and an information communication network, options information for appropriate selection of a user-desired accessory (component) can automatically prepared based on the accessory information served from the third party 37 to the server 38 and can be served to the users of robots, and then ordering information made by a user based on the served options information can automatically be supplied as customer/shipment information to an appropriate third party 37.

Thus, the user can easily purchase his desired component/device/accessory of his robot 1, and the third party 37 can distribute its component/device/accessory to the user over a large-scale information communication network with having only to register itself in the server 38 and without having to make any advertisement activity by itself.

Figure 17:
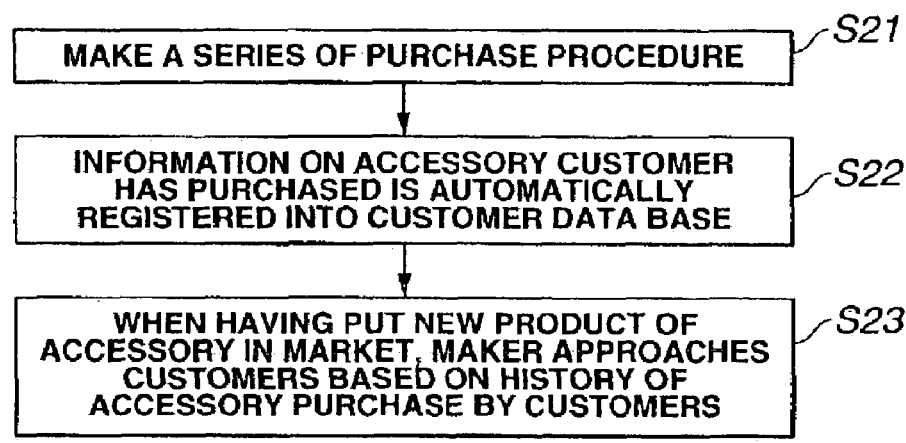
FIG. 17 is a chart showing an flow of operations effected in a new approach using information on purchase history of accessories.

Also, the server 38 (including the robotic device manufacturers) can enjoy many advantages of the above-mentioned distribution system. As an example of the merits, the server 38 can make a variety of activities by making the most of the customer data base. For example, when the users make a series of purchase procedures (in step S21), information on the accessories the customers have purchased are registered in the customer data base (in step S22) as shown in FIG. 17. A manufacturer having put a new product of robot component/device/accessory on market can make a sales approach to the customers based on the information on cumulated purchases of accessories included in the customer data base. The manufacturers (server) can analyze the customers' preference, taste and the like based on the information on the cumulated purchases of accessories, and can provide the customers with new-product information prepared based on the result of analysis. Since the server 38 can prepare various kinds of analysis result-based information on the basis of the customer data base, such information can automatically be served to the customers. For example, the new-product information is automatically served to appropriate customers by electronic mail or the like.

In the foregoing, the embodiment of the present invention has been described concerning the example that the user selects "Soft" 42 on the options selection screen as shown in FIG. 12 to purchase a software component. Next, purchase of a hardware component/device/accessory by selecting "Hard" 41 on the options selection screen will be described herebelow.

Figure 18:
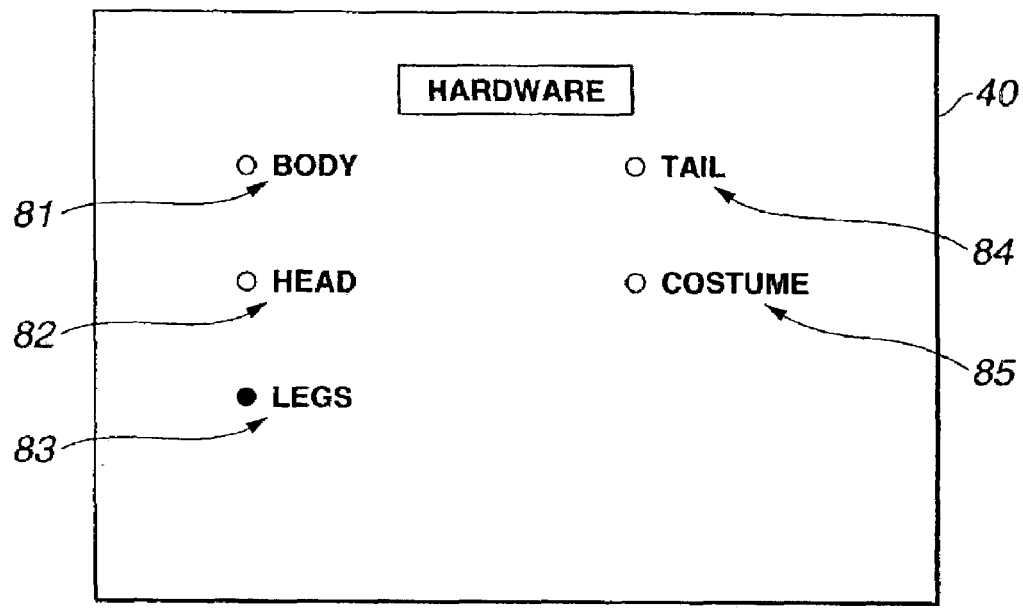
FIG. 18 is a plan view of a screen display showing options when a hardware item is selected.

When the "Hard" 41 is selected on the options selection screen, a screen 40 will appear as shown in FIG. 18. In this example, "Body" 81, "Head" 82, "Legs" 83 and "Tail" 84 as replaceable components/devices/accessories of the robot 1, or "Costume" 85 as a component/device/accessory which can be added to the robot 1, are displayed as selectable robot components/devices/accessories on the screen 40 as shown in FIG. 18.

Figure 19:
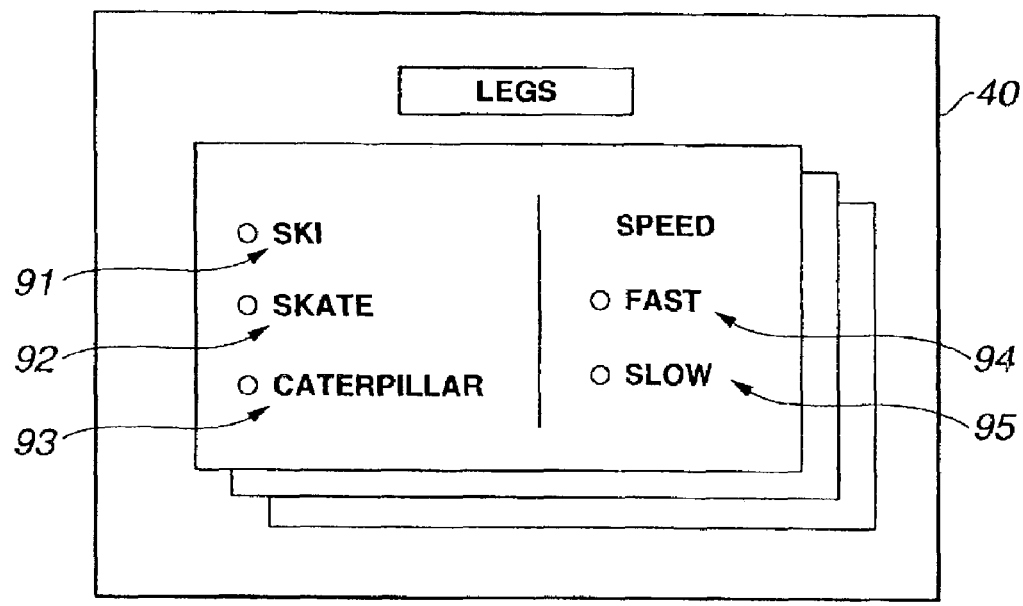
FIG. 19 is a plan view of a screen display showing options when the leg is selected from the hardware items.

When the "Legs" 83 is selected, a served list of component/device/accessory information on the type and speed (performance) of the leg is displayed on the screen 40 as shown in FIG. 19 in order to further narrow down potential components/devices/accessories. In this example, the screen 40 displays "Ski" 91, "Skate" 92 and "Caterpillar" 93 for the types of leg and "Fast" 94 and "Slow" 95 for the speed of the leg.

When the "Caterpillar" 93 and "Slow" 95 are selected on the screen 40, there will be displayed on the screen a number, defined by the final narrow-down of the potential components/devices/accessories, of the "Slow" and "Caterpillar" type legs (hardware). For example, five such legs are displayed on the screen in case the "5 displayed" 49 has been selected as in the above. Then the user selects his desired one from the components/devices/accessories displayed on the screen as the result of the final narrow-down.

Also, for selection of a hardware component, the component/device/accessory selection screen may be made to reflect information on the state of the robot 1, having been uploaded from the personal terminal devices.

Figure 20:
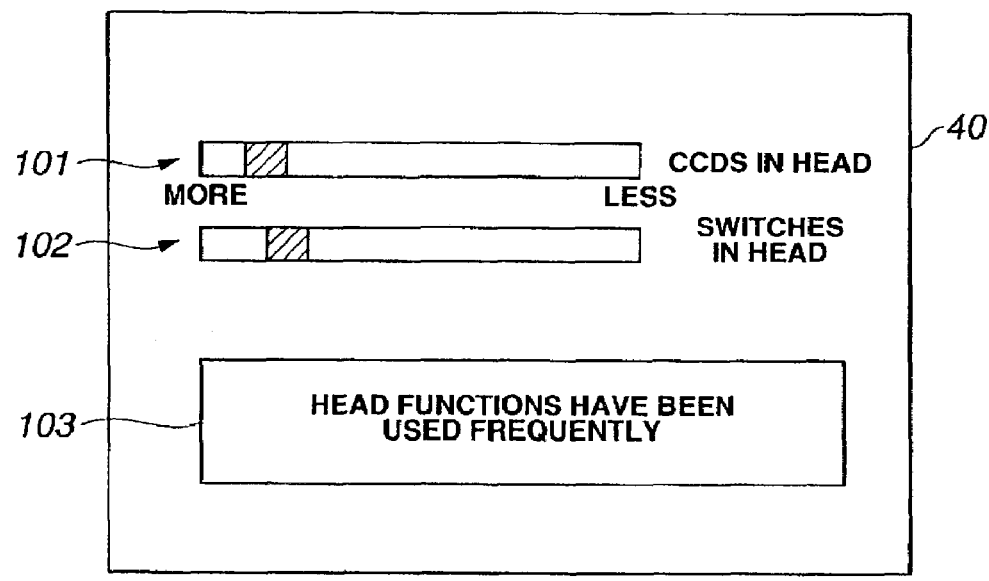
FIG. 20 is a plan view of a screen display showing parameters and a comment based on the state information of the robotic device in FIG. 1.
Figure 21:
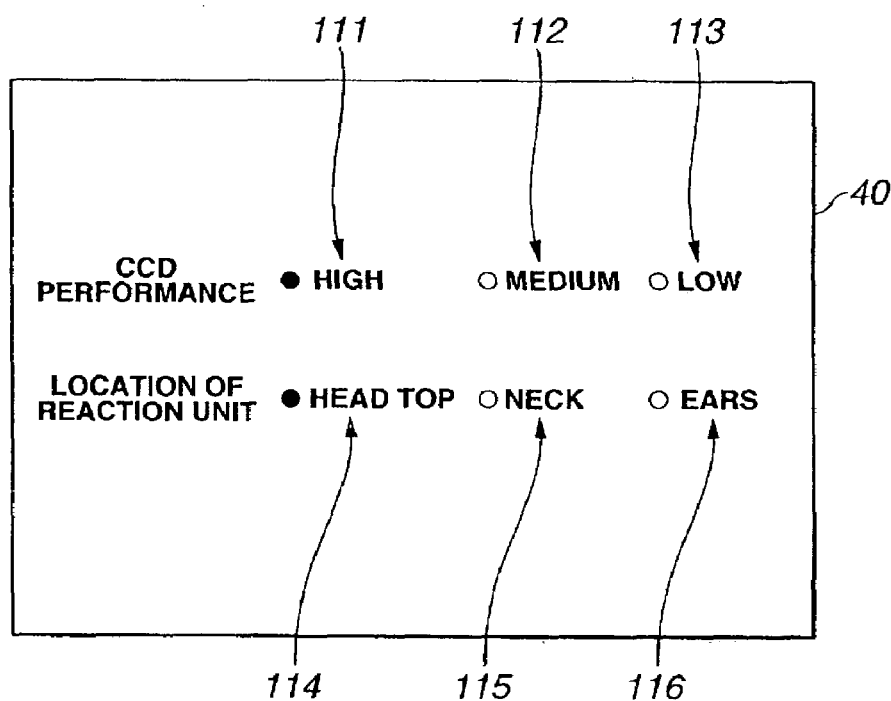
FIG. 21 is a plan view of a screen display showing options based on the state information of the hardware of the robotic device in FIG. 1.

The state information on the robot 1 includes information on the frequency with which the hardware of the robot 1 has been used. Assume here that the "Hard" 41 and "Head" 82 are selected for example. In this case, the screen will provide a parameter indication 101 for the frequency with which the CCDs in the head have been used, and a parameter indication 102 for the frequency with which the switch in the head (touch sensor) 17 has been used, as shown in FIG. 20. Also, when the CCDs and switch in the head have been used with high frequencies, respectively, there is provided on the screen a comment 103 that "The head functions have been used frequently", as shown in FIG. 20. Then, options are displayed in detail on the screen 40 as shown in FIG. 21.

More specifically, the screen 40 displays options "High" 111, "Middle" 112 and "Low" 113 for the "CCD performance", and options "Head top" 114, "Neck" 115 and "Ears" 116 for the "Location of reaction unit (touch sensor)

". The options for these "CCD performance" and "Location of reaction unit" on the screen 40 reflect the selection of the option "Head" 82 shown in FIG. 18.

Also, for selection of options, reference can be made to the state information having been uploaded from the robot 1 as in the selection of software. For example, when the sensors in the head have been used with a high frequency, there will be displayed on the screen 40 such options (touch sensor) which are provided near the head as the "Neck" 115 and "Ears" 116 in addition to the "Head top" 114.

When the option "High" 111 for the "CCD performance" and "Head top" 114 for the "Location of reaction unit" are selected as shown in FIG. 21, three types of heads based on the information are displayed. The three types of heads will be displayed when "3 displayed" (not shown) for the number of components/devices/accessories in FIG. 12 is selected.

Figure 22:
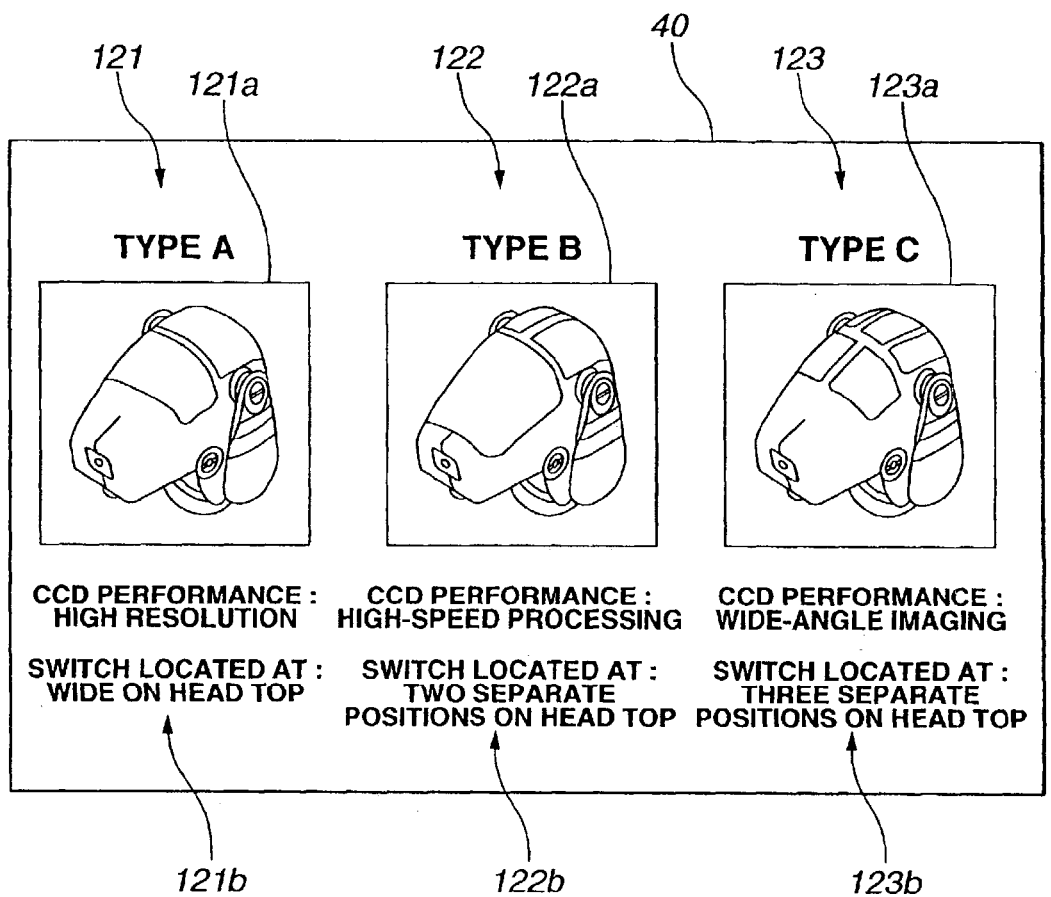
FIG. 22 is a plan view of a screen display showing head components/devices/accessories finally selected.

For example, indications 121, 122 and 123 of the three types of heads, respectively, are represented by images 121a, 122a and 123a and comments of features 121b, 122b and 123b, respectively, on the screen 40 as shown in FIG. 22. When the user checks the contents of the heads selected by the server 38 and sets his selection, a purchase screen will appear. The purchase screen is an information input screen for the methods of payment, methods of component/device/accessory delivery, etc. Seeing this screen, the use will make a purchase procedure.

As in the above, the information service system can serve optimum information on the software and hardware of the robot.

In the foregoing, the present invention has been described concerning the embodiment in which the information on the robot includes states (parameters) of the emotion, instinct and growth required for the action of the robot and the server 38 provides, based on the information, information intended for selection of components/devices/accessories such as options information. Note however that the present invention is not limited to this embodiment but when information on the robot which could reflect the selection of components/devices/accessories is available, the user can select optimum component/device/accessory for his robot. This will further be described below.

Figure 23:
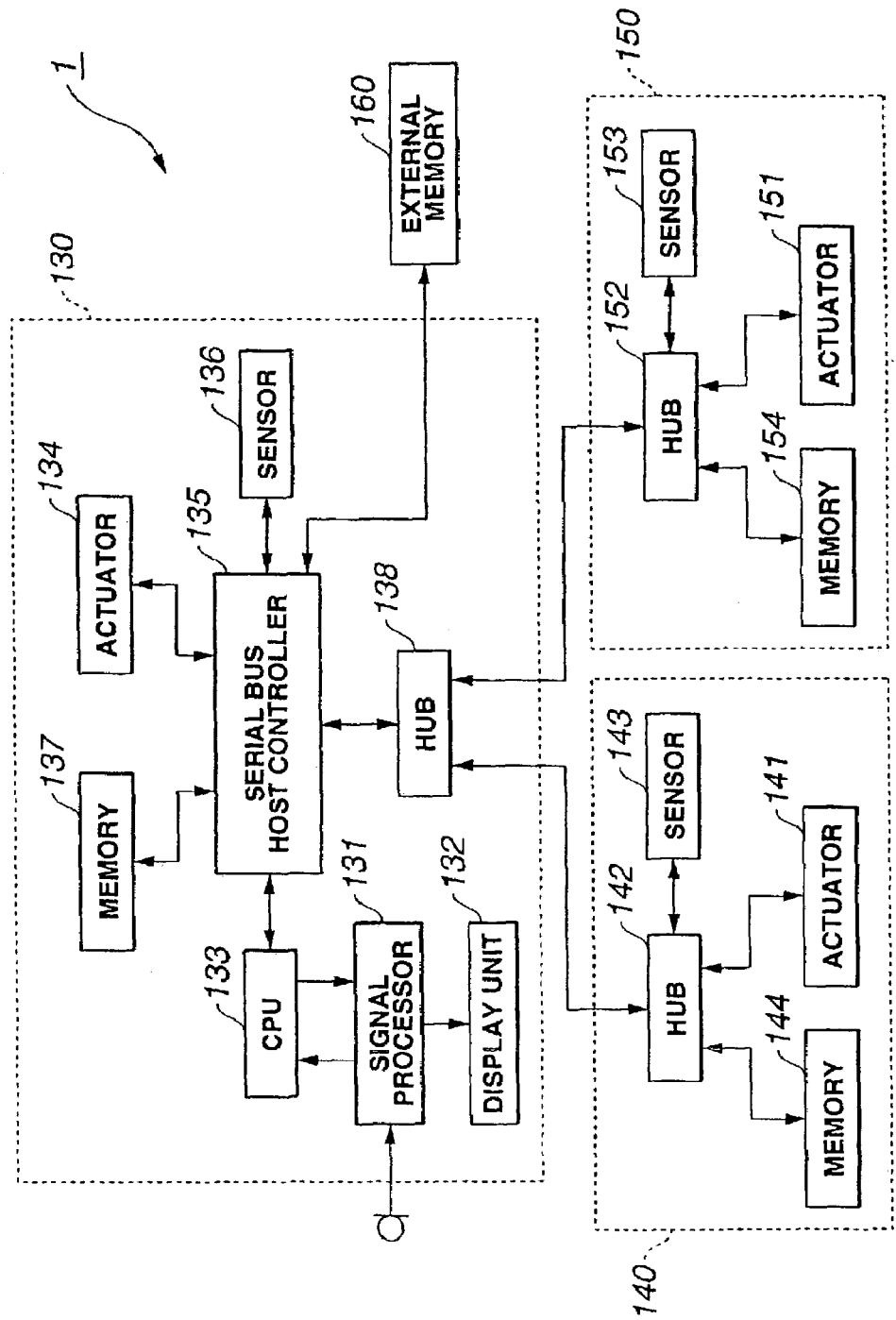
FIG. 23 is a block diagram of a robotic device composed of a plurality of component/device/accessory units.

In case the robot has stored (held) therein information on each of the parts (component) as robot-related information, the user can make a component/device/accessory selection which reflects the robot-related information. For example, by using information on each of replaceable components/devices/accessories of a robot which has stored therein the information on each component/device/accessory thereof, the user can select an optimum one of the components/devices/accessories for his robot. FIG. 23 shows an example of the construction of the robot 1 having stored therein information on each component/device/accessory thereof.

The robot 1 is composed of a plurality of replaceable units (component) including a body unit 130, head unit 140 and a leg unit 150.

The body unit 130 incorporates a signal processor 131, display unit 132, CPU 133, actuator 134, serial bus host controller 135, sensor 136, memory 137, hub 138, etc.

The signal processor 131 processes signals for display on the display unit 132. It is controlled by the CPU 133 which also controls each parts of the body unit 130. Further, the CPU 133 controls the head unit 140 and leg unit 150 in addition to the body unit 130.

The actuator 134 drives moving parts in the body unit 130. The actuator 134 is a motor for example, and controlled based on a control signal or the like supplied from the CPU 133 via the serial bus host controller 135.

The sensor 136 detects a variety of information. It includes the battery sensor 12 and thermo-sensor 13 for example shown in FIG. 2. A detection signal from the sensor 136 is sent to the CPU 133 via the serial bus host controller 135. For example, the CPU 133 controls each unit based on the detection signal from the sensor 136.

The memory 137 has stored therein a variety of information such as a program for the action of the robot 1. In addition, the memory 137 has stored therein information on the body unit 130 (robot-related information).

The information on the body unit 130 includes at least information on a robot model with which the body unit 130 is compatible, namely, information indicative of features of the body unit 130 such as model or type, form or shape, motor used, sensor used, etc.

The body unit 130 thus constructed is adapted to make data transfer to and from the bead and leg units 140 and 150 via the hub 138. For example, the body unit 130 supplies a control signal to the head and leg units 140 and 150 via the hub 138 and is supplied with detection signals from sensors 143 and 153 in the head and leg units 140 and 150, respectively, via the hub 138.

The body unit 130 has an external memory 160 removably connected thereto. The external memory 160 is a memory card MC or the like used to upload information on the robot 1 to the server 38 via the personal terminal device 31A as having previously been described.

On the other hand, the head unit 140 incorporates an actuator 141, hub 142, sensor 143, memory 144, etc.

The actuator 141 drives moving parts of the head unit 140, and is a motor for example. The actuator 141 is controlled based on a control signal or the like supplied from the CPU 133 in the body unit 130 via the hub 142.

The sensor 143 detects a variety of information, and it includes the speaker 18, touch sensor 17, etc. as shown in FIG. 2 for example. The sensor 143 sends a detection signal to the CPU 133 in the body unit 130 via the hub 142. The CPU 133 controls each unit based on the detection signal from the sensor 143.

The memory 144 has stored therein information on the head unit 140 (robot-related information). Similar to the information on the body unit 130, the information on the head unit 140 includes at least information on a robot model with which the head unit 140 is compatible, namely, information indicative of features of the head unit 140 such as model or type, form or shape, motor used, sensor used, etc.

The leg unit 150 incorporates an actuator 151, hub 152, sensor 153, memory 154, etc.

The actuator 151 drives moving parts of the leg unit 150, and is for example a motor to drive the four legs of the leg unit 150. The actuator 151 is controlled based on a control signal or the like supplied from the CPU 133 in the body unit 130 via the hub 152.

The sensor 153 detects a variety of information. The sensor 153 sends a detection signal to the CPU 133 in the body unit 130 via the hub 152. The CPU 133 controls each unit based on the detection signal from the sensor 153.

The memory 154 has stored therein information on the leg unit 150 (robot-related information). Similar to the information on the body and head units 130 and 140, the information on the leg unit 150 includes at least information on a robot model with which the leg unit 150 is compatible, namely, information indicative of features of the leg unit 150 such as model or type, form or shape, motor used, sensor used, etc.

The robot 1 constructed from the aforementioned body, head and leg units 130, 140 and 150 which are replaceable.

The server 38 serves, based on the information on each unit from the robot 1, information on optimum components/devices/accessories to the users of the robot 1.

The external memory 160 has stored therein information on each of the units of the robot 1. It has also stored therein information on the shape or form of the robot 1, namely, information on whether the robot 1 is of a dog robot or a humanoid robot for example. The information on each unit of the robot 1 is sent (uploaded) from the external memory 160 to the server 38 via the personal terminal devices.

The server 38 has cumulatively stored therein much components/devices/accessories information. Based on the unit information and components/devices/accessories information received as in the above, the server 38 will select components/devices/accessories usable with the robot. For example; the components/devices/accessories are available from the third party as having previously been described, and the components/devices/accessories information includes the information on such components/devices/accessories. The components/devices/accessories information includes model or type of a robot with which the components/devices/accessories are compatible.

The server 38 refers to the unit information and components/devices/accessories information thus received with respect to the model or type of the robot with which the components/devices/accessories are compatible in order to select components/devices/accessories usable with the robot. Such a selection by the server 38 is effected by the CPU 42 (see FIG. 7) functioning to select components/devices/accessories information for example.

As the result of selection, the server 38 prepares options information including the extracted components/devices/accessories information. That is to say, it prepares options information including information on predetermined components/devices/accessories compatible with a user's robot.

Then, the server 38 sends the options information to the user (personal terminal device) having sent the unit information to the server 38. The user will thus be able to select his desired component/device/accessory based on the options information served from the server 38. A component/device/accessory thus selected by the user will always be compatible with his robot.

Thus, the server 38 can serve to the user information including the robot information usable for selection of component/device/accessory and based on which an optimum component/device/accessory can be selected by the user.

The invention claimed is:

1. An information server comprising:

first storage means, external to a robotic device, storing robot-related information related to a plurality of replaceable components/devices/accessories that comprise the robotic device;

second storage means, external to the robotic device, storing information about components/devices/accessories that are compatible replacements for the components/devices/accessories that comprise the robotic device; and means for reading the robot-related information from the first storage means and selecting one or more compatible components/devices/accessories from the second storage means, wherein the server prepares options information on one or more compatible components/devices/accessories and sends the options information to a user terminal remote from the server.

2. The apparatus according to claim 1, wherein the robot-related information includes information on types of robotic devices in which at least the compatible components/devices/accessories in consideration can be used.

3. The apparatus according to claim 2, wherein the predetermined piece of components/devices/accessories information concerns compatible components/devices/accessories usable in the robotic device.

* * * * *